United States Patent

Becker

(10) Patent No.: US 12,202,759 B2
(45) Date of Patent: Jan. 21, 2025

(54) METHODS FOR LASER FORMING TRANSPARENT ARTICLES FROM A TRANSPARENT MOTHER SHEET AND PROCESSING THE TRANSPARENT ARTICLES IN-SITU

(71) Applicant: Corning Incorporated, Corning, NY (US)

(72) Inventor: Alejandro Antonio Becker, Stockdorf (DE)

(73) Assignee: CORNING INCORPORATED, Corning, NY (US)

( * ) Notice: Subject to any disclaimer, the term of this patent is extended or adjusted under 35 U.S.C. 154(b) by 1744 days.

(21) Appl. No.: 16/276,109

(22) Filed: Feb. 14, 2019

(65) Prior Publication Data

US 2019/0263709 A1 Aug. 29, 2019

Related U.S. Application Data

(60) Provisional application No. 62/635,197, filed on Feb. 26, 2018.

(51) Int. Cl.
*C03B 33/02* (2006.01)
*B23K 26/0622* (2014.01)
(Continued)

(52) U.S. Cl.
CPC ...... *C03B 33/0222* (2013.01); *B23K 26/0622* (2015.10); *B23K 26/38* (2013.01);
(Continued)

(58) Field of Classification Search
CPC .................. C03B 33/0222; B23K 2103/54
See application file for complete search history.

(56) References Cited

U.S. PATENT DOCUMENTS 6,787,732 B1 9/2004 Xuan et al.
9,850,159 B2 12/2017 Bhuyan et al.
(Continued)

FOREIGN PATENT DOCUMENTS

CN 106029293 A 10/2016
CN 106414351 A 2/2017
(Continued)

OTHER PUBLICATIONS

International Search Report and Written Opinion PCT/US2019/019376 Dated May 20, 2019, 12 PGS.
(Continued)

*Primary Examiner* — Erin Snelting
(74) *Attorney, Agent, or Firm* — Yiqun Zhao

(57) ABSTRACT

A method for processing a transparent mother sheet includes forming one or more closed contours in the transparent mother sheet that each define a perimeter of a transparent article. Forming each of the one or more closed contours includes directing a pulsed laser beam into the transparent mother sheet to produce defect within the transparent mother sheet and translating the transparent mother sheet and the pulsed laser beam relative to each other thereby laser forming defects along the one or more closed contours. The method further includes separating a portion of the transparent mother sheet along the closed contours, thereby forming one or more transparent articles, where the transparent articles are frictionally engaged with a frame portion of the transparent mother sheet, applying material to a surface the transparent articles, and releasing the transparent articles from frictional engagement with the frame portion.

16 Claims, 16 Drawing Sheets

(51) Int. Cl.

| | |
|---|---|
| *B23K 26/38* | (2014.01) |
| *B23K 26/402* | (2014.01) |
| *B23K 26/53* | (2014.01) |
| *B23K 103/00* | (2006.01) |
| *C03B 33/033* | (2006.01) |
| *C03B 33/04* | (2006.01) |
| *C03B 33/07* | (2006.01) |
| *C03B 33/09* | (2006.01) |
| *C03C 23/00* | (2006.01) |

(52) U.S. Cl.
CPC ............ *B23K 26/402* (2013.01); *B23K 26/53* (2015.10); *C03B 33/033* (2013.01); *C03B 33/04* (2013.01); *C03B 33/078* (2013.01); *C03B 33/091* (2013.01); *C03C 23/0025* (2013.01); *B23K 2103/54* (2018.08)

(56) References Cited

U.S. PATENT DOCUMENTS

| | | |
|---|---|---|
| 2014/0027951 A1 | 1/2014 | Srinivas et al. |
| 2014/0199519 A1 | 7/2014 | Schillinger et al. |
| 2015/0038313 A1 | 2/2015 | Hosseini |
| 2015/0165560 A1* | 6/2015 | Hackert ................ C03B 33/082 428/131 |
| 2015/0165563 A1 | 6/2015 | Manley et al. |
| 2015/0166393 A1 | 6/2015 | Marjanovic et al. |
| 2018/0134606 A1* | 5/2018 | Wagner ................ C03B 33/0222 |
| 2018/0148366 A1 | 5/2018 | Dawes et al. |
| 2019/0185376 A1* | 6/2019 | Ito .......................... C03C 17/30 |

FOREIGN PATENT DOCUMENTS

| | | |
|---|---|---|
| CN | 106457476 A | 2/2017 |
| CN | 107073642 A | 8/2017 |
| CN | 111770901 A | 10/2020 |
| JP | 2003-334675 A | 11/2003 |
| JP | 2016-506351 A | 3/2016 |
| JP | 2017-502901 A | 1/2017 |
| TW | 201711978 A | 4/2017 |
| WO | 2014/079570 A1 | 5/2014 |
| WO | 2017192835 A1 | 11/2017 |
| WO | 2018/043016 A1 | 3/2018 |

OTHER PUBLICATIONS

Japanese Patent Application No. 2020-544846, Office Action, dated Jun. 7, 2023, 5 pages (2 pages of English Translation and 3 pages of Original Copy); Japanese Patent Office.

Chinese Patent Application No. 201980015615.2, Office Action, dated May 13, 2022, 20 pages (10 pages of English Translation and 10 pages of Original Document), Chinese Patent Office.

Borghi et al; "M2 Factor of Bessel-Gauss Beams"; Optics Letters; vol. 22, No. 5, (Mar. 1997) pp. 262-264.

Siegman; "New Developments in Laser Resonators"; Proc. SPIE 1224, Optical Resonaqtors ( Jun. 1990) pp. 2-14.

* cited by examiner

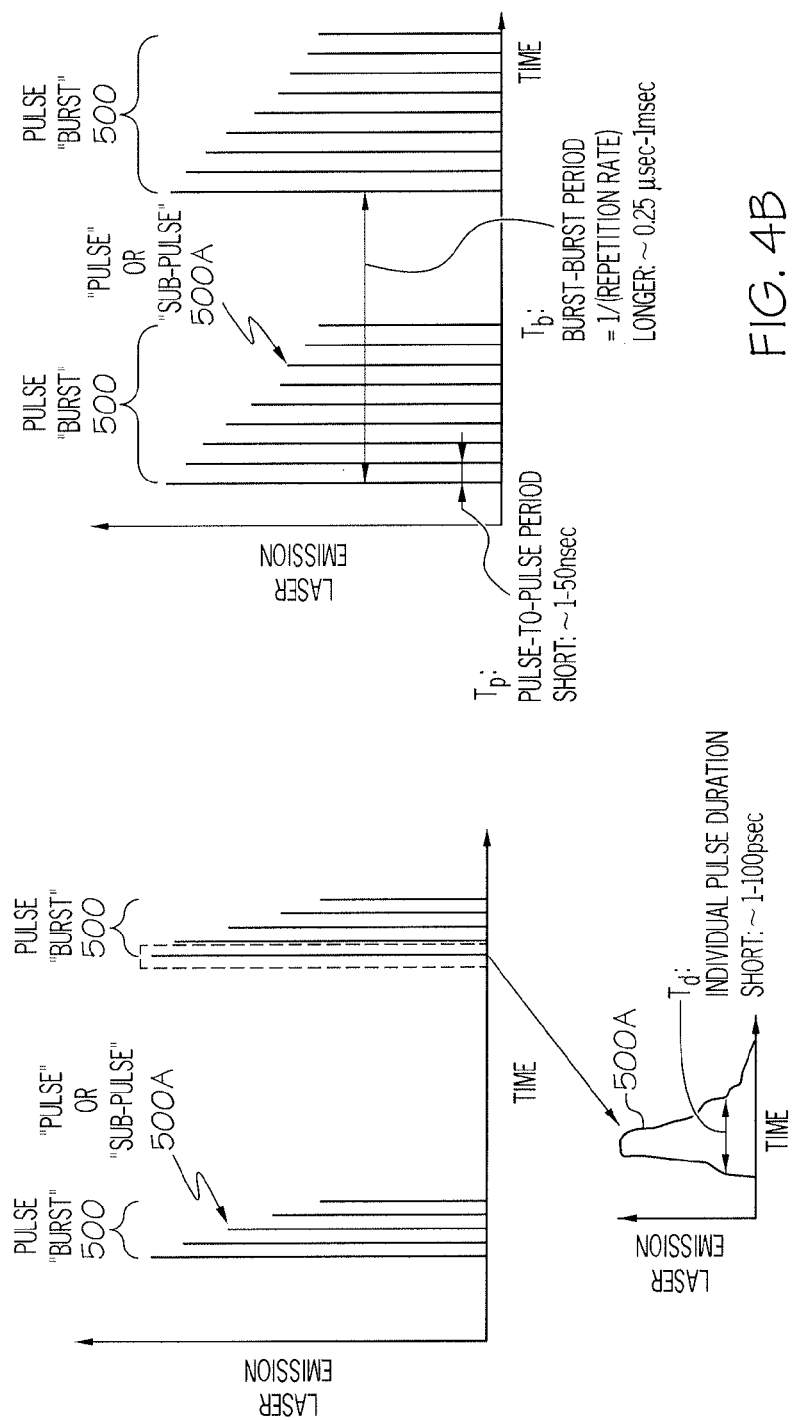

METHODS FOR LASER FORMING TRANSPARENT ARTICLES FROM A TRANSPARENT MOTHER SHEET AND PROCESSING THE TRANSPARENT ARTICLES IN-SITU

This application claims the benefit of priority to U.S. Provisional Application Ser. No. 62/635,197 filed on Feb. 26, 2018, the content of which is relied upon and incorporated herein by reference in its entirety.

BACKGROUND

Field

The present specification generally relates to apparatuses and methods for laser processing transparent workpieces, such as transparent articles and transparent mother sheets, and more particularly to laser forming transparent articles from a transparent mother sheet and processing the transparent articles in-situ.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting, separating, and processing glass substrates. It is of great interest to have a faster, cleaner, cheaper, more repeatable, and more reliable method of separating and processing glass substrates than what is currently practiced in the market. Accordingly, a need exists for alternative improved methods for separating and processing glass substrates.

SUMMARY

According to a first embodiment, a method for processing a transparent mother sheet comprises forming one or more closed contours in the transparent mother sheet, each closed contour comprising a plurality of defects in the transparent mother sheet such that each closed contour defines a perimeter of a transparent article. Forming each of the one or more closed contours comprises directing a pulsed laser beam oriented along a beam pathway and output by a beam source into the transparent mother sheet such that a portion of the pulsed laser beam directed into the transparent mother sheet generates an induced absorption within the transparent mother sheet, the induced absorption producing a defect within the transparent mother sheet; and translating the transparent mother sheet and the pulsed laser beam relative to each other along one or more closed contour lines, thereby laser forming defects along the one or more closed contour lines within the transparent mother sheet. The method further includes separating a portion of the transparent mother sheet along the closed contours, thereby forming one or more transparent articles, where at least one of the one or more transparent articles is frictionally engaged with a frame portion of the transparent mother sheet, applying one or more layers of material to a surface of at least one of the one or more transparent articles after separating the portion of the transparent mother sheet to form the one or more transparent articles, and releasing at least one of the one or more transparent articles from frictional engagement with the frame portion of the transparent mother sheet after applying the one or more layers of material to the surface of at least one of the one or more transparent articles.

A second embodiment includes the method of the first embodiment, wherein separating the transparent mother sheet along the closed contours and thereby forming the one or more transparent articles comprises applying stress to the one or more closed contours.

A third embodiment includes the method of the second embodiment, wherein applying stress to the one or more closed contours comprises applying a mechanical stress to the one or more closed contours.

A fourth embodiment includes the method of the second embodiment, wherein applying stress to the one or more closed contours comprises directing an infrared laser beam onto the transparent mother sheet along or near the one or more closed contours.

A fifth embodiment includes the method of any of the first through fourth embodiments, wherein at least one of the one or more layers of material comprises a metallization layer.

A sixth embodiment includes the method of any of the first through fifth embodiments, wherein at least one or the one or more layers of material comprises an anti-reflective coating.

A seventh embodiment includes the method of any of the first through sixth embodiments, wherein applying the one or more layers of material comprises vapor depositing the one or more layers of material.

An eighth embodiment, in the method of any of the first through seventh embodiments, applying the one or more layers of material includes spin coating the one or more layers of material.

A ninth embodiment includes the method of any of the first though eighth embodiments, wherein at least one of the one or more layers of material comprises a glass, glass-ceramic, a polymer, or a combination thereof.

A tenth embodiment includes the method of any of the first through ninth embodiments, wherein applying the one or more layers of material comprises bonding the one or more layers of material to at least one of the one or more transparent articles.

An eleventh embodiment includes the method of any of the first though tenth embodiment, wherein the transparent mother sheet comprises a first transparent mother sheet and at least one of the one or more layers of material comprises a second transparent mother sheet.

A twelfth embodiment includes the method of eleventh embodiment, wherein the second transparent mother sheet comprises one or more closed contours each comprising a plurality of defects.

A thirteenth embodiment includes the method of the twelfth embodiment, wherein the one or more closed contours of the second transparent mother sheet are not aligned with the one or more closed contours of the first transparent mother sheet.

A fourteenth embodiment includes the method of the eleventh embodiment, wherein the second transparent mother sheet comprises one or more transparent articles and a frame portion that surrounds the one or more transparent articles and is in frictional engagement with the one or more transparent articles.

A fifteenth embodiment includes the method of the fourteenth embodiment, wherein the one or more transparent articles and the frame portion of the second transparent mother sheet are not aligned with the one or more transparent articles and the frame portion of the first transparent mother sheet.

A sixteenth embodiment includes the method of the eleventh through the fifteenth embodiments, wherein at least one of the one or more layers of material comprises a metallization layer disposed between the first transparent mother sheet and the second transparent mother sheet.

A seventeenth embodiment includes the method of any of the eleventh through the sixteenth embodiments, wherein the first transparent mother sheet is bonded to the second transparent mother sheet.

An eighteenth embodiment includes the method of any of the first through the seventeenth embodiments, releasing the at least one of the one or more transparent articles from frictional engagement with the frame portion removes contact between each of the one or more transparent articles and the frame portion.

A nineteenth embodiment includes the method of any of the first through the eighteenth embodiments further comprising forming one or more release lines in the frame portion of the transparent mother sheet.

A twentieth embodiment includes the method of the nineteenth embodiment, wherein the one or more release lines comprise a release perimeter in the frame portion of the transparent mother sheet and one or more release spurs extending from the release perimeter towards an outer surface of the frame portion.

A twenty-first embodiment includes the method of the nineteenth embodiment, wherein forming the one or more release lines releases the at least one of the one or more transparent articles from frictional engagement with the frame portion of the transparent mother sheet.

A twenty-second embodiment includes the method of the nineteenth embodiment, wherein releasing each of the one or more transparent articles comprises applying stress to a notch portion extending between at least one of the one or more release lines and the outer surface of the frame portion of the transparent mother sheet.

A twenty-third embodiment includes the method of any of the first through twenty-second embodiments, wherein the one or more transparent articles comprise a first transparent article and a second transparent article, the first transparent article is frictionally engaged with the frame portion of the transparent mother sheet and the second transparent article is frictionally engaged with the first transparent article.

A twenty-fourth embodiment includes the method of any of the first through twenty-third embodiments, wherein the one or more transparent articles comprise an inner array of transparent articles and an outer array of transparent articles, the outer array of transparent articles are in frictional engagement with the frame portion of the transparent mother sheet; and the inner array of transparent articles are separated from the frame portion by the outer array of transparent articles and at least one of the inner array of transparent articles are in frictional engagement with the outer array of transparent articles.

A twenty-fifth embodiment includes the method of any of the first through the twenty-fourth embodiments, wherein the pulsed laser beam traverses an aspheric optical element before irradiating the transparent mother sheet.

A twenty-sixth embodiment includes the method of the twenty-fifth embodiment, wherein the aspheric optical element comprises a refractive axicon, a reflective axicon, negative axicon, a spatial light modulator, a diffractive optic, or a cubically shaped optical element.

A twenty-seventh embodiment includes the method of any of the first through the twenty-sixth embodiments, wherein the portion of the pulsed laser beam directed into the transparent mother sheet comprises a wavelength $\lambda$, a spot size $w_o$, and a cross section that comprises a Rayleigh range $Z_R$ that is greater than $$F_D \frac{\pi w_0^2}{\lambda},$$

where $F_D$ is a dimensionless divergence factor comprising a value of 10 or greater.

A twenty-eighth embodiment, in the method of the twenty-seventh embodiment, the dimensionless divergence factor $F_D$ comprises a value of from 10 to 2000.

A twenty-ninth embodiment includes the method of the twenty-seventh embodiment, wherein the dimensionless divergence factor $F_D$ comprises a value of from 50 to 1500.

A thirtieth embodiment includes the method of the twenty-seventh embodiment, wherein the dimensionless divergence factor $F_D$ comprises a value of from 100 to 1000.

A thirty-first embodiment includes the method of any of the first through the thirtieth embodiments, wherein a spacing between adjacent defects is 50 µm or less.

A thirty-second embodiment includes the method of any of the first through the thirty-first embodiments, wherein a spacing between adjacent defects is 25 µm or less.

A thirty-third embodiment includes the method of any of the first through the thirty-second embodiments, wherein a spacing between adjacent defects is 15 µm or less.

A thirty-fourth embodiment includes the method of any of the first through the thirty-third embodiments, wherein the transparent mother sheet comprises an alkali aluminosilicate glass material.

A thirty-fifth embodiment includes the method of any of the first through the thirty-fourth embodiments, wherein the pulsed laser beam has a wavelength $\lambda$ and wherein the transparent mother sheet has combined losses due to linear absorption and scattering less than 20%/mm in a beam propagation direction.

A thirty-sixth embodiment includes the method of any of the first through the thirty-fifth embodiments, wherein the beam source comprises a pulsed beam source that produces pulse bursts with from 1 sub-pulse per pulse burst to 30 sub-pulses per pulse burst and a pulse burst energy is from 100 µJ to 600 µJ per pulse burst.

A thirty-seventh embodiment includes the method of any of the first through the thirty-sixth embodiments further comprising forming one or more fiducials on the transparent mother sheet.

According to a thirty-eighth embodiment, a method of processing a transparent mother sheet comprises forming one or more closed contours in the transparent mother sheet, each closed contour comprising a plurality of defects in the transparent mother sheet such that each closed contour defines a transparent article perimeter of a transparent article. Forming each of the one or more closed contours comprises directing a pulsed laser beam oriented along a beam pathway and output by a beam source into the transparent mother sheet such that a portion of the pulsed laser beam directed into the transparent mother sheet generates an induced absorption within the transparent mother sheet, the induced absorption producing a defect within the transparent mother sheet and translating the transparent mother sheet and the pulsed laser beam relative to each other along one or more closed contour lines, thereby laser forming defects along the one or more closed contour lines within the transparent mother sheet. The method further includes separating a portion of the transparent mother sheet along the closed contours, thereby forming one or more transparent articles, the one or more transparent articles frictionally engaged with a frame portion of the transparent mother sheet, modifying a surface of at least of the one or more transparent articles after separating the portion of the transparent mother sheet to form the one or more transparent articles, and releasing at least one of the one or more transparent articles from frictional engagement with the frame portion of the transparent mother sheet after applying the one or more layers of material to the surface of at least one of the one or more transparent articles.

A thirty-ninth embodiment includes the method of the thirty-eighth embodiment, wherein separating the transparent mother sheet along the closed contour and thereby forming one or more transparent articles comprises applying stress to the one or more closed contours by directing an infrared laser beam onto the transparent mother sheet along or near the one or more closed contours.

A fortieth embodiment includes the method of the thirty-eighth or thirty-ninth embodiment, wherein modifying the surface of at least one of the one or more transparent articles comprises polishing the surface of at least one of the one or more transparent articles.

A forty-first embodiment includes the method of any of the thirty-eighth through fortieth embodiments, wherein modifying the surface of at least one of the one or more transparent articles includes cleaning the surface of at least one of the one or more transparent articles.

A forty-second embodiment includes the method of any of the thirty-eighth through forty-first embodiments, wherein modifying the surface of at least one of the one or more transparent articles comprises roughening the surface of at least one of the one or more transparent articles.

A forty-third embodiment includes the method of any of the thirty-eighth through forty-first embodiments, further comprising forming one or more release lines in the frame portion of the transparent mother sheet.

A forty-fourth embodiment includes the method of the forty-third embodiment, wherein the one or more release lines comprise a release perimeter in the frame portion of the transparent mother sheet and one or more release spurs extending from the release perimeter towards an outer surface of the frame portion.

A forty-fifth embodiment includes the method of the forty-third embodiment, wherein forming the one or more release lines releases the at least one of the one or more transparent articles from frictional engagement with the frame portion of the transparent mother sheet.

A forty-sixth embodiment includes the method of the forty-third embodiment, wherein releasing each of the one or more transparent articles comprises applying stress to a notch portion extending between at least one of the one or more release lines and the outer surface of the frame portion of the transparent mother sheet.

A forty-seventh embodiment includes the method of any of the thirty-eighth through forty-sixth embodiments, wherein the one or more transparent articles comprise a first transparent article and a second transparent article, the first transparent article is frictionally engaged with the frame portion of the transparent mother sheet, and the second transparent article is frictionally engaged with the first transparent article.

A forty-eighth embodiment includes the method of any of the thirty-eighth through forty-seventh embodiments, wherein the one or more transparent articles comprise an inner array of transparent articles and an outer array of transparent articles, the outer array of transparent articles are in frictional engagement with the frame portion of the transparent mother sheet, and the inner array of transparent articles are separated from the frame portion by the outer array of transparent articles and at least one of the inner array of transparent articles are in frictional engagement with the outer array of transparent articles.

A forty-ninth embodiment includes the method of any of the thirty-eighth through forty-eighth embodiments, wherein the pulsed laser beam traverses an aspheric optical element before irradiating the transparent mother sheet.

A fiftieth embodiment includes the method of any of the thirty-eighth through forty-ninth embodiments, wherein the portion of the pulsed laser beam directed into the transparent mother sheet comprises a wavelength $\lambda$, a spot size $w_o$, and a cross section that comprises a Rayleigh range $Z_R$ that is greater than $$F_D \frac{\pi w_0^2}{\lambda},$$

where $F_D$ is a dimensionless divergence factor comprising a value of 10 or greater.

A fifty-first embodiment includes the method of any of the thirty-eighth through fiftieth embodiments, wherein a spacing between adjacent defects is 30 μm or less.

According to a fifty-second embodiments, a transparent workpiece assembly comprises one or more transparent articles comprising a first major surface, a second major surface, and one or more side surfaces, a frame portion surrounding the one or more transparent articles and comprising a first major surface, a second major surface, one or more inner surfaces and an outer surface, wherein at least one of the one or more transparent articles are frictionally engaged with at least one or the one or more inner surfaces of the frame portion to retain each of the one or more transparent articles in frictional engagement with the frame portion, and one or more layers of material disposed on the first major surface of at least one of the one or more transparent articles and disposed contiguously over at least one separated contour associated with the at least one of the one or more transparent articles.

A fifty-third embodiment includes the transparent workpiece assembly of the fifty-second embodiment, wherein the one or more transparent articles comprise a first transparent article and a second transparent article, the first transparent article is frictionally engaged with the frame portion, and the second transparent article is frictionally engaged with the first transparent article.

A fifty-forth embodiment includes the transparent workpiece assembly of the fifty-third embodiment, wherein the one or more layers of material are disposed on a first major surface of the first transparent article, a first major surface of the second transparent article, and disposed contiguously over a separated contour that forms an interface between the first transparent article and the second transparent article.

A fifty-fifth embodiment includes the transparent workpiece assembly of the fifty-third embodiment, wherein the one or more layers of material are disposed on a first major surface of the first transparent article, a first major surface of the frame portion, and disposed contiguously over a separated contour that forms an interface between the first transparent article and the frame portion.

A fifty-sixth embodiment includes the transparent workpiece assembly of any of the fifty-second through the fifty-fifth embodiments, wherein the one or more transparent articles comprise an inner array of transparent articles and an outer array of transparent articles, the outer array of transparent articles are in frictional engagement with the frame portion, and the inner array of transparent articles are separated from the frame portion by the outer array of transparent articles and at least one of the inner array of transparent articles are in frictional engagement with the outer array of transparent articles.

A fifty-seventh embodiment includes the transparent workpiece assembly of any of the fifty-second through the fifty-sixth embodiments, wherein the frame portion further comprises one or more release lines.

A fifty-eighth embodiment includes the transparent workpiece assembly of the fifty-seventh embodiment, wherein the one or more release lines comprise a release perimeter in the frame portion and one or more release spurs extending from the release perimeter towards an outer surface of the frame portion.

A fifty-ninth embodiment includes the transparent workpiece assembly of the fifty-seventh embodiments, further comprising a notch portion extending between at least one of the one or more release lines and the outer surface of the frame portion.

A sixtieth embodiment includes the transparent workpiece assembly of any of the fifty-second through the fifty-ninth embodiments, wherein at least one of the one or more layers of material comprise a metallization layer.

A sixty-first embodiment includes the transparent workpiece assembly of any of the fifty-second through the sixtieth embodiments, wherein at least one of the one or more layers of material comprise an anti-reflective coating.

A sixty-second embodiment includes the transparent workpiece assembly of any of the fifty-second through the sixty-first embodiments, wherein at least one of the one or more layers of material comprise a glass, glass-ceramic, a polymer, or a combination thereof.

A sixty-third embodiment includes the transparent workpiece assembly of any of the fifty-second through the sixty-second embodiments, wherein at least one of the one or more transparent articles and the frame portion surrounding the one or more transparent articles collectively comprise a first transparent mother sheet and at least one of the one or more layers of material comprises a second transparent mother sheet that comprises one or more transparent articles and a frame portion surrounding the one or more transparent articles.

A sixty-fourth embodiment includes the transparent workpiece assembly of the sixty-third embodiment, wherein at least one of the one or more transparent articles of the second transparent mother sheet is frictionally engaged the frame portion of the second transparent mother sheet to retain each of the one or more transparent articles of the second transparent mother sheet in frictional engagement with the frame portion of the second transparent mother sheet.

A sixty-fifth embodiment includes the transparent workpiece assembly of the sixty-third embodiment, wherein at least one of the one or more layers of material comprises a metallization layer disposed between the first transparent mother sheet and the second transparent mother sheet.

A sixty-sixth embodiment includes the transparent workpiece assembly of the sixty-third embodiment, wherein the first transparent mother sheet is bonded to the second transparent mother sheet.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A graphically depicts the relative intensity of laser pulses within an exemplary pulse burst vs. time, according to one or more embodiments described herein, according to one or more embodiments described herein;

FIG. 4B graphically depicts relative intensity of laser pulses vs. time within another exemplary pulse burst, according to one or more embodiments described herein;

DETAILED DESCRIPTION

Figure 1A:
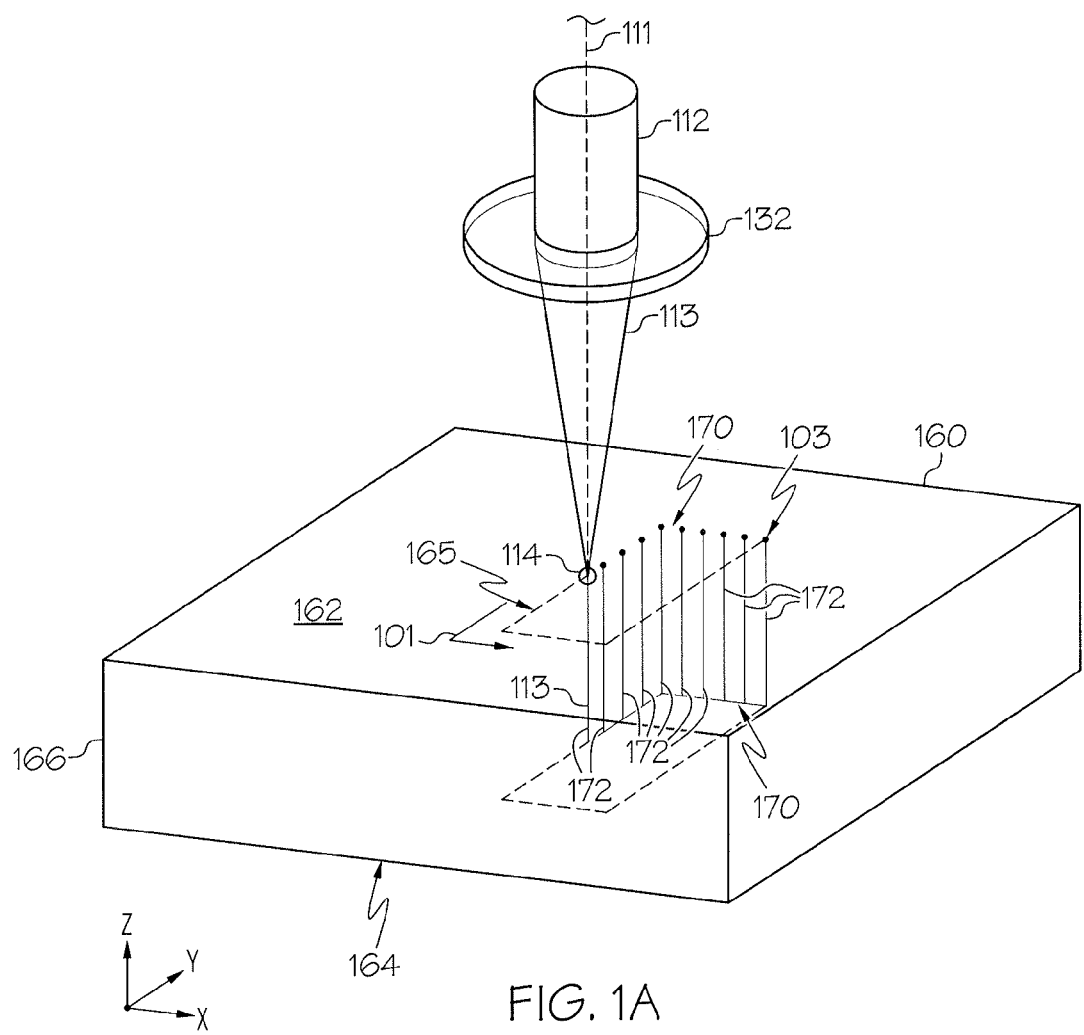
FIG. 1A schematically depicts the formation of a closed contour of defects, according to one or more embodiments described herein.

Reference will now be made in detail to embodiments of processes for laser processing transparent workpieces (e.g., transparent mother sheets and transparent articles formed from transparent mother sheets), such as glass workpieces, examples of which are illustrated in the accompanying drawings. Whenever possible, the same reference numerals will be used throughout the drawings to refer to the same or like parts. According to one or more embodiments described herein, a transparent mother sheet may be laser processed to form one or more closed contours in the transparent mother sheet, each closed contour comprising a series of defects that define a perimeter of one or more transparent articles that may be separated from the transparent mother sheet. According to one embodiment, a beam source outputs a pulsed laser beam, which is directed into the transparent mother sheet to create a series of defects in the transparent mother sheet, thereby laser forming the one or more closed contours, which each define a perimeter of a transparent article formed from the transparent mother sheet. The defects may be referred to, in various embodiments herein, as line defects, perforations, or nano-perforations in the workpiece. Next, the transparent articles having perimeters defined by the one or more closed contours may be separated from the transparent mother sheet by applying a stress to the one or more closed contours, for example, a chemical stress (e.g., via chemical etching), a thermal stress (e.g., via heated laser irradiation), a mechanical stress, or the like.

After separating the transparent articles from the transparent mother sheet, the transparent articles remain frictionally engaged with the transparent mother sheet without an additional processing step because a minimal separation gap (i.e. minimal kerf) is present between the perimeter of transparent articles and a frame portion of the transparent mother sheet that remains after the transparent articles are separated. This frictional engagement allows for additional processing of surfaces of the transparent articles (and, optionally, the remaining frame portion of the transparent mother sheet) in situ, while the transparent articles remain frictionally engaged with a frame portion of the transparent mother sheet. As an example, one or more layers of material may be applied to a surface of one or more transparent articles (and optionally, a surface of the remaining frame portion of the transparent mother sheet). As another example, a surface of one or more transparent articles (and optionally, a surface of the remaining frame portion of the transparent mother sheet) may be modified (e.g., polished, roughened, cleaned, or the like). After these additional processing steps, the one or more transparent articles may be released from frictional engagement with the frame portion of the transparent mother sheets. Thus, embodiments described herein are directed to methods of forming transparent articles from a transparent mother sheet using laser processing techniques and thereafter processing surfaces of the transparent articles while these transparent articles remain frictionally engaged with the remaining portion of the transparent mother sheet, thus facilitating collective surface processing of transparent articles, which may otherwise be difficult to individually process due to size constraints, manufacturing constraints, or the like. Further, retaining the transparent articles in frictional engagement with the remaining portion of the transparent mother sheet allows for easier shipping of these transparent articles before subsequent processing and separation. Various embodiments of forming and processing transparent articles from a transparent mother sheet will be described herein with specific reference to the appended drawings.

The phrase "transparent workpiece," as used herein, means a workpiece formed from glass or glass-ceramic which is transparent, where the term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. According to one or more embodiments, the transparent workpiece may have a thickness of from about 50 microns ($\mu$m) to about 10 mm (such as from about 100 $\mu$m to about 5 mm, from about 0.5 mm to about 3 mm, or from about 100 $\mu$m to about 2 mm, for example, 100 $\mu$m, 250 $\mu$m, 300 $\mu$m, 500 $\mu$m, 700 $\mu$m, 1 mm, 1.2 mm, 1.5 mm, 2 mm, 5 mm, 7 mm, or the like. Transparent workpieces described herein include a "transparent mother sheet," a "transparent article," and a "frame portion." As used herein, "transparent mother sheet" refers to a transparent workpiece from which additional (smaller) transparent workpieces (e.g., transparent articles) may be separated. As used herein "transparent article" refers to a transparent workpiece that is separated from a transparent mother sheet. Further, as used herein, "frame portion" refers to some or all of the remaining portion of transparent mother sheet from which the transparent article(s) are separated (e.g., a contiguous remaining portion that surrounds the transparent article(s)).

Further, the present disclosure describes methods for processing transparent workpieces. As used herein, "laser processing" may include forming contours (e.g., closed contours) in transparent workpieces, separating transparent workpieces, or combinations thereof. Transparent workpieces may comprise glass workpieces formed from glass compositions, such as borosilicate glass, soda-lime glass, aluminosilicate glass, alkali aluminosilicate glass, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for mechanical strengthening before or after laser processing the transparent workpiece and before or after chemical etching of the transparent workpiece. For example, the transparent workpiece may comprise ion exchanged or ion exchangeable glass, such as Corning Gorilla® Glass available from Corning Incorporated of Corning, NY (e.g., code 2318, code 2319, and code 2320). Further, these ion exchanged glasses may have coefficients of thermal expansion (CTE) of from about 6 ppm/° C. to about 10 ppm/° C. In some embodiments, the glass composition of the transparent workpiece may include greater than about 1.0 mol. % boron and/or compounds containing boron, including, without limitation, $B_2O_3$. In another embodiment, the glass compositions from which the transparent workpieces are formed include less than or equal to about 1.0 mol. % of oxides of boron and/or compounds containing boron. Moreover, the transparent workpiece may comprise other components which are transparent to the wavelength of the laser, for example, crystals such as sapphire or zinc selenide.

Some transparent workpieces may be utilized as display and/or TFT (thin film transistor) substrates. Some examples of such glasses or glass compositions suitable for display or TFT use are EAGLE XG®, and CORNING LOTUS™ available from Corning Incorporated of Corning, NY The alkaline earth boro-aluminosilicate glass compositions may be formulated to be suitable for use as substrates for electronic applications including, without limitation, substrates for TFTs. The glass compositions used in conjunction with TFTs typically have CTEs similar to that of silicon (such as less than $5 \times 10^{-6}$/K, or even less than $4 \times 10^{-6}$/K, for example, approximately $3 \times 10^{-6}$/K, or about $2.5 \times 10^{-6}$/K to about $3.5 \times 10^{-6}$/K), and have low levels of alkali within the glass. Low levels of alkali (e.g., trace amounts of about 0 wt. % to 2 wt. %, such as less than 1 wt. %, for example, less than 0.5 wt. %) may be used in TFT applications because alkali dopants, under some conditions, leach out of glass and contaminate or "poison" the TFTs, possibly rendering the TFTs inoperable.

The phrase "contour line," as used herein, denotes a line (e.g., a line, a curve, etc.) of intended separation on the surface of a transparent workpiece along which the transparent workpiece will be separated into multiple portions upon exposure to the appropriate processing conditions. Further, the phrase "closed contour line," as used herein, denotes a particular contour line (e.g., a line, a curve, etc.) that extends along a closed pathway on the surface of a transparent workpiece (e.g., along a surface of a transparent mother sheet). The closed contour line defines a desired perimeter of a transparent article, which may be separated from the transparent mother sheet. Further, the phrase "contour," as used herein, refers to a plurality of defects in introduced into the transparent workpiece using various techniques along the contour line and the phrase "closed contour," as used herein, refers to a contour that is formed along a closed contour line. Moreover, as used herein, a "defect" may include an area of modified material (relative to the bulk material), void space, scratch, flaw, hole, or other deformities in the transparent workpiece which enables separation of material of the transparent mother sheet along the contour lines and closed contour lines (e.g., separation of the contours and the closed contours) to form transparent articles from the transparent mother sheets by additional processing, such as by infrared laser processing, mechanical stress, or other separation processes. The defects may penetrate the full depth of the glass. It should be understood that while sometimes described as "holes" or "hole-like," the defects disclosed herein may generally not be void spaces, but are rather portions of the transparent mother sheet which has been modified by laser processing as described herein.

In operation, one or more transparent articles may be separated from the transparent mother sheet by first forming one or more closed contours in the transparent mother sheet and thereafter, stressing (e.g., heating, for example, using an infrared laser such as a $CO_2$ laser, CO laser, or the like), the surface of the transparent workpiece on the closed contour to create stresses in the transparent workpiece, such as thermal stresses. The stresses ultimately lead to the spontaneous separation of the workpiece along the closed contour. Further, in some embodiments, such as embodiments in which the transparent mother sheet is strengthened (e.g., ion-exchanged) the subsequent separating step may occur via a spontaneous break occurring due to stress present in the transparent mother sheet, depending on the type, thickness, and structure of the transparent workpiece. For example, stress may be present in the transparent mother sheet after strengthening the transparent mother sheet, which may cause spontaneous separation of the transparent mother sheet along the closed contour without further heating or mechanical separation steps.

Figure 1B:
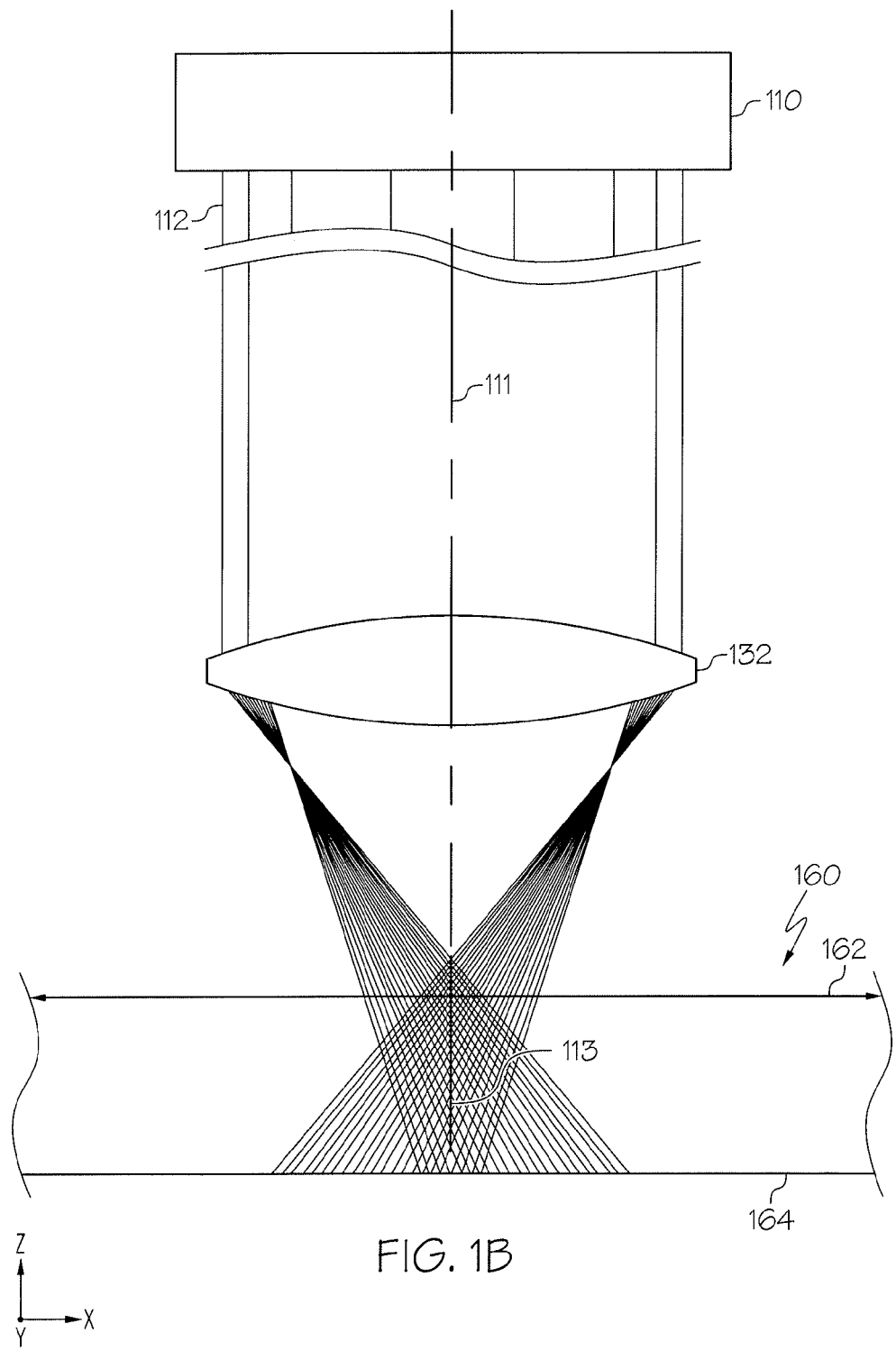
FIG. 1B schematically depicts an example pulsed laser beam focal line during processing of a transparent mother sheet, according to one or more embodiments described herein.

Referring now to FIGS. 1A and 1B, by way of example, a transparent mother sheet 160, such as a glass mother sheet or a glass-ceramic mother sheet, is schematically depicted undergoing processing according to the methods described herein. The transparent mother sheet 160 comprises a first major surface 162 and a second major surface 164, which may be opposite the first major surface 162 and one or more perimeter surfaces 166. Note that embodiments of the transparent mother sheet 160 having a rounded shape, such as a circular or oval shape may have a single, continuous perimeter surface 166 and embodiments of the transparent mother sheet 160 having a polygonal shape, such as a rectangular shape may comprise multiple perimeter surfaces 166.

FIGS. 1A and 1B depict the formation of a closed contour 170 in the transparent mother sheet 160, which may be formed by translating a pulsed laser beam 112 and the transparent mother sheet 160 relative to one another such that the pulsed laser beam 112 translates relative to the transparent mother sheet 160 in a translation direction 101. FIGS. 1A and 1B depict the pulsed laser beam 112 along a beam pathway 111 and oriented such that the pulsed laser beam 112 may be focused into a pulsed laser beam focal line 113 within the transparent mother sheet 160, for example, using an aspheric optical element 120 (FIG. 3), for example, an axicon and one or more lenses (e.g., a first lens 130 and a second lens 132, as described below and depicted in FIG. 3). For example, the position of the pulsed laser beam focal line 113 may be controlled along the Z-axis and about the Z-axis. Further, the pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. Further, the pulsed laser beam focal line 113 may be a portion of a quasi-non-diffracting beam, as defined in more detail below.

FIG. 1A depicts that the pulsed laser beam 112 forms a beam spot 114 projected onto the first major surface 162 of the transparent mother sheet 160. While the pulsed laser beam 112 is depicted initially irradiating the transparent mother sheet 160 at the first major surface 162 in FIG. 1A, it should be understood that in other embodiments, the pulsed laser beam 112 may instead initially irradiate the transparent mother sheet 160 at the second major surface 164. Further, as also used herein "beam spot" refers to a cross section of a laser beam (e.g., the pulsed laser beam 112) at a point of first contact with a transparent workpiece (e.g., the transparent mother sheet 160).

Figure 2:
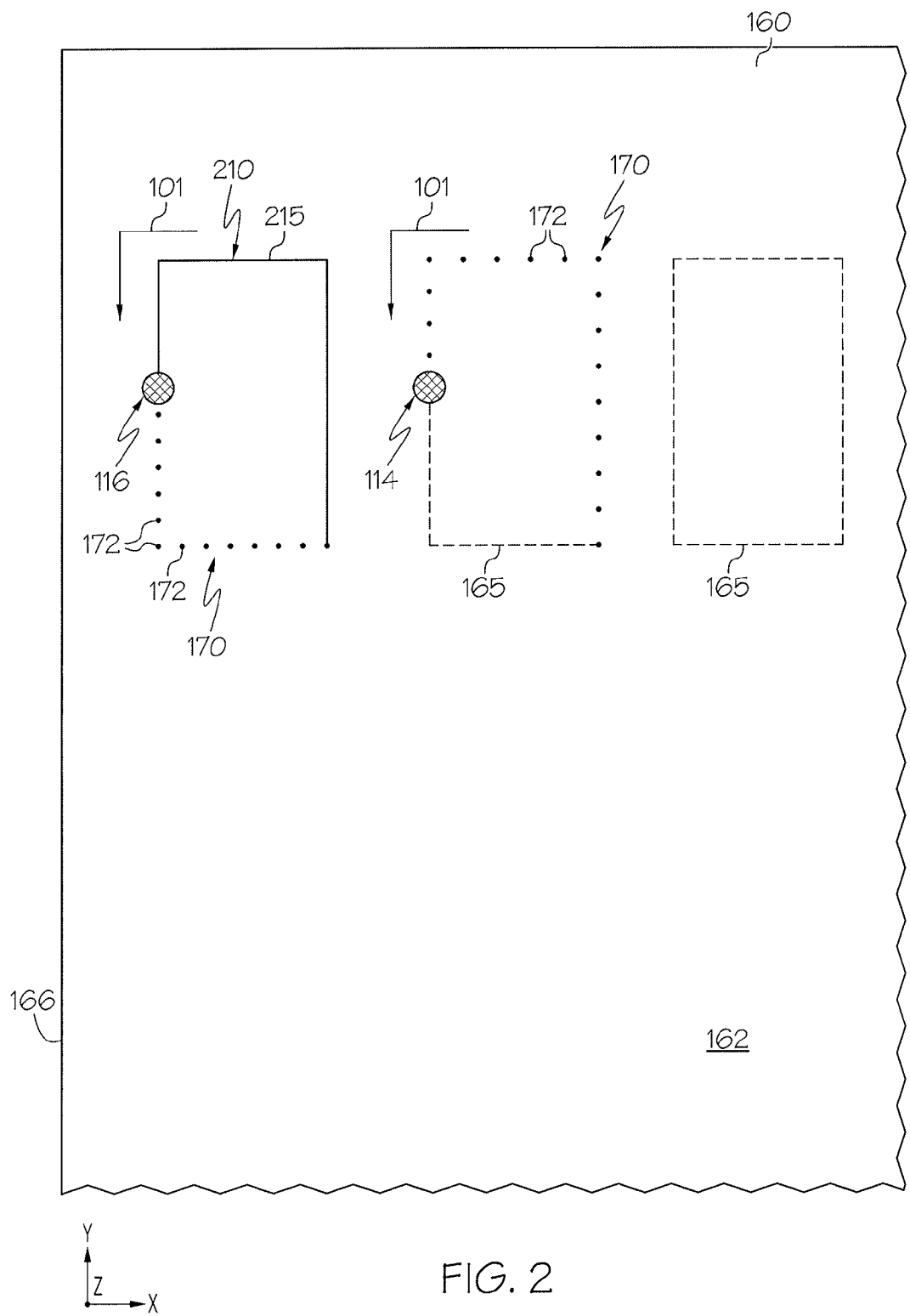
FIG. 2 schematically depicts a beam spot of a pulsed laser beam traversing a closed contour line to form a closed contour of defects in a transparent mother sheet and a beam spot of an infrared laser beam traversing a closed contour of defects to form a transparent article from the transparent mother sheet, according to one or more embodiments described herein.

Referring now to FIG. 2, the separation of a transparent article 210 from the transparent mother sheet 160 is schematically depicted. FIG. 2 depicts a closed contour line 165 before laser processing (right side of FIG. 2), a closed contour 170 comprising defects 172 being formed along a closed contour line 165 (center of FIG. 2), and a transparent article 210 being formed along a closed contour 170 by separating the transparent mother sheet 160 along the closed contour 170 (left side of FIG. 2). The closed contour line 165 delineates a line of intended separation along which the closed contour 170 may be formed in the transparent mother sheet 160 and thereafter, one or more transparent articles 210 may be formed from the transparent mother sheet 160. In other words, each closed contour line 165 and closed contour 170 defines a perimeter 215 of a transparent article 210 that may be separated from the transparent mother sheet 160. Further, each closed contour 170 comprises a plurality of defects 172 that extend into the transparent mother sheet 160 and establish a path for separation of the material of the transparent mother sheet 160 enclosed by the closed contour 170 (which becomes a transparent article 210) from the remaining portion of transparent mother sheet 160 (e.g., the frame portion 220 of the transparent mother sheet 160, depicted in FIG. 5A).

In operation, the closed contour 170 may be formed by irradiating the closed contour line 165 with the pulsed laser beam 112 (depicted as the beam spot 114 in FIG. 2) and translating the pulsed laser beam 112 and the transparent mother sheet 160 relative to each other along the closed contour line 165 in the translation direction 101 to form the defects 172 of the closed contour 170. Thereafter, the transparent article 210 may be separated from the transparent mother sheet 160 by irradiating the closed contour 170 with an infrared laser beam (depicted as an infrared laser beam spot 116 in FIG. 2) and translating the infrared laser beam and the transparent workpiece relative to each other along or near the closed contour 170 in the translation direction 101.

While the closed contour 170 is depicted in FIGS. 1A and 2 as a rectangle, it should be understood that other closed configurations are contemplated and possible including, without limitation, circles, ellipses, squares, hexagons, ovals, regular geometric shapes, irregular shapes, polygonal shapes, arbitrary shapes, and the like. Further, as depicted in FIG. 2, the embodiments described herein may be used to form multiple closed contours 170 in a single transparent mother sheet 160 and thereby form multiple transparent articles 210 from the transparent mother sheet 160.

Referring still to FIGS. 1A and 2, in the embodiments described herein, a pulsed laser beam 112 (with a beam spot 114 projected onto the transparent mother sheet 160) may be directed onto the transparent mother sheet 160 (e.g., condensed into a high aspect ratio line focus that penetrates through at least a portion of the thickness of the transparent mother sheet 160). This forms the pulsed laser beam focal line 113. Further, the beam spot 114 is an example cross section of the pulsed laser beam focal line 113 and when the pulsed laser beam focal line 113 irradiates the transparent mother sheet 160 (forming the beam spot 114), the pulsed laser beam focal line 113 penetrates at least a portion of the transparent mother sheet 160.

Figure 3:
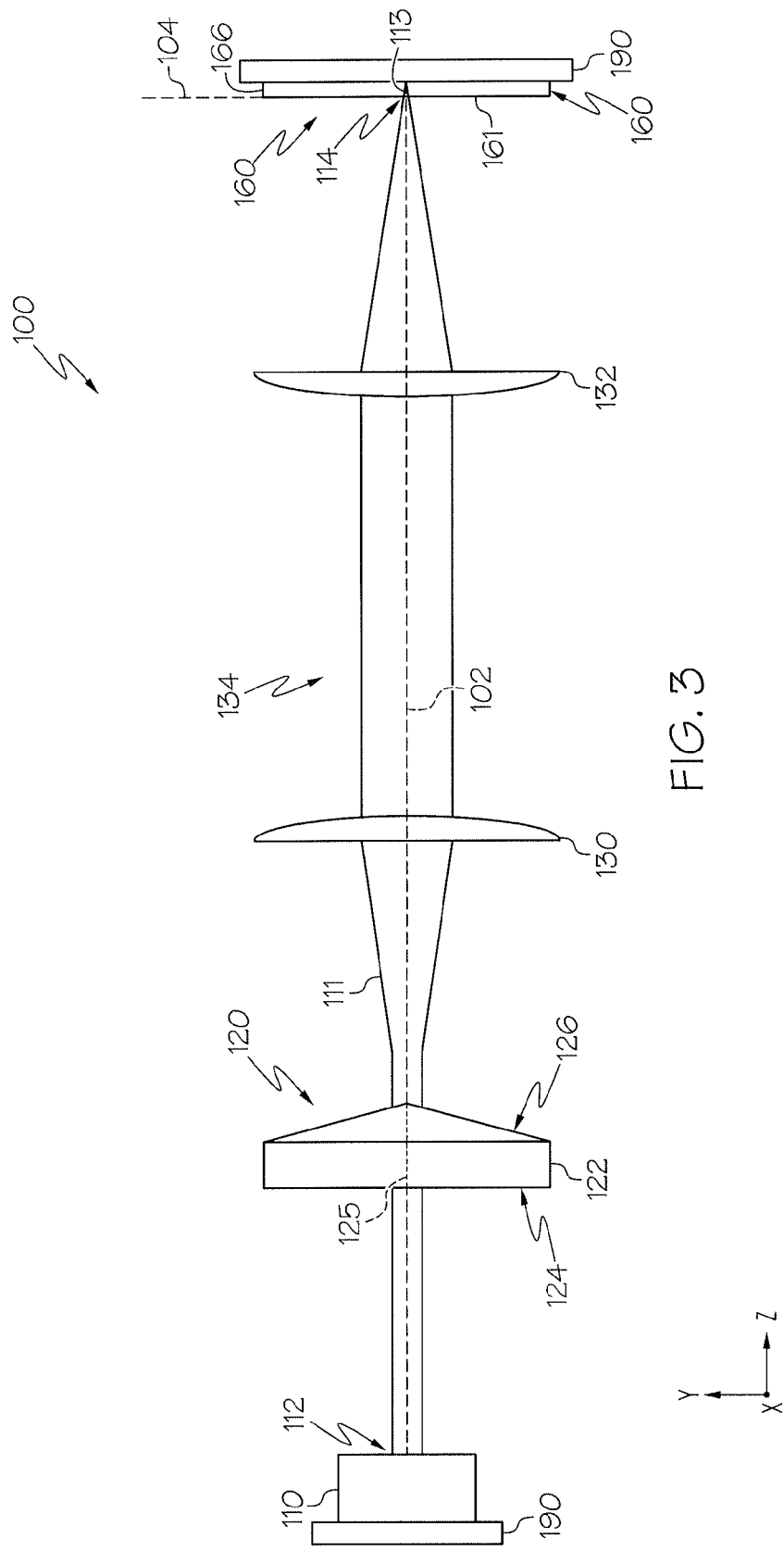
FIG. 3 schematically depicts an optical assembly for pulsed laser processing, according to one or more embodiments described herein.

Further, the pulsed laser beam 112 may be translated relative to the transparent mother sheet 160 (e.g., in the translation direction 101) to form the plurality of defects 172 of the closed contour 170. Directing or localizing the pulsed laser beam 112 into the transparent mother sheet 160 generates an induced absorption within the transparent mother sheet 160 and deposits enough energy to break chemical bonds in the transparent mother sheet 160 at spaced locations along the closed contour line 165 to form the defects 172. According to one or more embodiments, the pulsed laser beam 112 may be translated across the transparent mother sheet 160 by motion of the transparent mother sheet 160 (e.g., motion of a translation stage 190 coupled to the transparent mother sheet 160, as shown in FIG. 3), motion of the pulsed laser beam 112 (e.g., motion of the pulsed laser beam focal line 113), or motion of both the transparent mother sheet 160 and the pulsed laser beam focal line 113. By translating the pulsed laser beam focal line 113 relative to the transparent mother sheet 160, the plurality of defects 172 may be formed in the transparent mother sheet 160.

In some embodiments, the defects 172 may generally be spaced apart from one another by a distance along the closed contour 170 of from about 0.1 µm to about 500 µm, for example, about 1 µm to about 200 µm, about 2 µm to about 100 µm, about 5 µm to about 20 µm, or the like. For example, suitable spacing between the defects 172 may be from about 0.1 µm to about 50 µm, such as from about 5 µm to about 15 µm, from about 5 µm to about 12 µm, from about 7 µm to about 15 µm, or from about 7 µm to about 12 µm for the TFT/display glass compositions. In some embodiments, a spacing between adjacent defects 172 may be about 50 µm or less, 45 µm or less, 40 µm or less, 35 µm or less, 30 µm or less, 25 µm or less, 20 µm or less, 15 µm or less, 10 µm or less, or the like. Further, the translation of the transparent mother sheet 160 relative to the pulsed laser beam 112 may be performed by moving the transparent mother sheet 160 and/or the beam source 110 using one or more translation stages 190 (FIG. 3).

Referring again to FIGS. 1A and 2, the pulsed laser beam 112 used to form the defects 172 further has an intensity distribution $I(X,Y,Z)$, where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 120, as described in more detail below with respect to the optical assembly 100 depicted in FIG. 3. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the transparent mother sheet 160. Example quasi non-diffracting beams include Gauss-Bessel beams and Bessel beams.

Diffraction is one factor that leads to divergence of pulsed laser beams 112. Other factors include focusing or defocusing caused by the optical systems forming the pulsed laser beams 112 or refraction and scattering at interfaces. Pulsed laser beams 112 for forming the defects 172 of the closed contour 170 may have beam spots 114 with low divergence and weak diffraction. The divergence of the pulsed laser beam 112 is characterized by the Rayleigh range $Z_R$, which is related to the variance $\sigma^2$ of the intensity distribution and beam propagation factor $M^2$ of the pulsed laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the pulsed laser beam 112 having a time-averaged intensity profile I(x, y, z) are given by the following expressions:

$$\bar{x}(z) = \frac{\int_{-\infty}^{\infty}\int_{-\infty}^{\infty} x I(x, y, z) dx dy}{\int_{-\infty}^{\infty}\int_{-\infty}^{\infty} I(x, y, z) dx dy} \quad (1)$$

$$\bar{y}(z) = \frac{\int_{-\infty}^{\infty}\int_{-\infty}^{\infty} y I(x, y, z) dx dy}{\int_{-\infty}^{\infty}\int_{-\infty}^{\infty} I(x, y, z) dx dy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the pulsed laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x, y, z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z) dx dy}{\int_{-\infty}^{\infty}\int_{-\infty}^{\infty} I(x, y, z) dx dy} \quad (3)$$

$$\sigma_{0y}^2(z) = \frac{\int_{-\infty}^{\infty}\int_{-\infty}^{\infty} y^2 I(x, y, z) dx dy}{\int_{-\infty}^{\infty}\int_{-\infty}^{\infty} I(x, y, z) dx dy} \quad (4)$$

$$\sigma_{\infty x}^2 = \frac{\int_{-\infty}^{\infty}\int_{-\infty}^{\infty} v_x^2 \tilde{I}(v_x, v_y) dv_x dv_y}{\int_{-\infty}^{\infty}\int_{-\infty}^{\infty} \tilde{I}(v_x, v_y) dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y) dv_x dv_y}{\int_{-\infty}^{\infty}\int_{-\infty}^{\infty} \tilde{I}(v_x, v_y) dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x, y, z)$ for an arbitrary optical beam (where $I(x, y, z) \equiv |\tilde{u}(x, y, z)|^2$) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(Z) = \sigma_x^2(z_{0x}) + \lambda^2 \sigma_{\infty x}^2 (z - z_{0x})^2 \quad (7)$$

$$\sigma_y^2(Z) = \sigma_y^2(z_{0y}) + \lambda^2 \sigma_{\infty y}^2 (z - z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the pulsed laser beam 112. Equations (7) and (8) indicate that $\sigma_x^2(z)$ and $\sigma_y^2(z)$ increase quadratically with z in either direction from the minimum values associated with the waist position of the pulsed laser beam 112 (e.g., the waist portion of the pulsed laser beam focal line 113). Further, in the embodiments described herein comprising a beam spot 114 that is axisymmetric and thereby comprises an axisymmetric intensity distribution I(x,y), $\sigma_x^2(z)=\sigma_y^2(z)$ and in the embodiments described herein comprising a beam spot 114 that is non-axisymmetric and thereby comprises a non-axisymmetric intensity distribution I(x,y), $\sigma_x^2(z)\neq\sigma_y^2(z)$, i.e., $\sigma_x^2(z)<\sigma_y^2(z)$ or $\sigma_x^2(z)>\sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 \propto 4\pi\sigma_{0x}\sigma_{\infty x} \quad (9)$$

$$M_y^2 \propto 4\pi\sigma_{0y}\sigma_{\infty y} \quad (9)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \quad (11)$$

$$\sigma_y^2(z) = \sigma_{0y}^2(z_{0y}) + \frac{\lambda^2 M_y^4}{(4\pi\sigma_{0y})^2}(z-z_{0y})^2 \quad (12)$$

which can be rewritten as:

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2\lambda} \quad (15)$$

$$Z_{Ry} = \frac{4\pi\sigma_{0y}^2}{M_y^2\lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx}=Z_{Ry}$ and in the embodiments described herein comprising a beam spot 114 that is non-axisymmetric and thereby comprises a non-axisymmetric intensity distribution I(x,y), $Z_{Rx}\neq Z_{Ry}$, i.e., $Z_{Rx}<Z_{Ry}$ or $Z_{Rx}>Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the $TEM_{00}$ mode of a Gaussian beam, the intensity profile is given by:

$$I(x,y) = \frac{\sqrt{\pi}}{2}w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2\lambda} = \frac{\pi w_0^2}{\lambda} \quad (22)$$

$$Z_{Ry} = \frac{4\pi\sigma_{0y}^2}{M_y^2\lambda} = \frac{\pi w_0^2}{\lambda} \quad (23)$$

$$w^2(x) = w_0^2 + \frac{\lambda^2}{(\pi w_0)^2}(z-z_0)^2 = w_0^2\left[1 + \frac{(z-z_0)^2}{Z_R^2}\right] \quad (24)$$

where $Z_R=Z_{Rx}=Z_{Ry}$. For Gaussian beams, it is further noted that $M^2=M_x^2=M_y^2=1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x}=\sigma_{0y}$. Thus, for axisymmetric beams, the cross section dimension may be characterized with a single spot size parameter, where $w_o=2\sigma_0$. Spot size can be similarly defined for non-axisymmetric beam cross sections where, unlike an axisymmetric beam, $\sigma_{0x}\neq\sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox}=2\sigma_{0x} \quad (25)$$

$$w_{oy}=2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle ϕ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $W_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects 172 in the beam propagation direction (e.g. depth dimension of the transparent mother sheet 160), a pulsed laser beam 112 having low divergence may be used. In one or more embodiments, pulsed laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (29)$$

and $$Z_{Ry,min} = \frac{4\pi\sigma_{0,min}^2}{M_y^2 \lambda} \quad (30)$$

Since divergence of the laser beam occurs over a shorter distance in the direction having the smallest Rayleigh range, the intensity distribution of the pulsed laser beam 112 used to form defects 172 may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a pulsed laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 μm, greater than or equal to 100 μm, greater than or equal to 200 μm, greater than or equal to 300 μm, greater than or equal to 500 μm, greater than or equal to 1 mm, greater than or equal to 2 mm, greater than or equal to 3 mm, greater than or equal to 5 mm, in the range from 50 μm to 10 mm, in the range from 100 μm to 5 mm, in the range from 200 μm to 4 mm, in the range from 300 μm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 μm, greater than or equal to 0.50 μm, greater than or equal to 0.75 μm, greater than or equal to 1.0 μm, greater than or equal to 2.0 μm, greater than or equal to 3.0 μm, greater than or equal to 5.0 μm, in the range from 0.25 μm to 10 μm, in the range from 0.25 μm to 5.0 μm, in the range from 0.25 μm to 2.5 μm, in the range from 0.50 μm to 10 μm, in the range from 0.50 μm to 5.0 μm, in the range from 0.50 μm to 2.5 μm, in the range from 0.75 μm to 10 μm, in the range from 0.75 μm to 5.0 μm, in the range from 0.75 μm to 2.5 μm, or the like.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (31) or Equation (32) with a value of $F_D \geq 10$. As the value of $F_D$ increases, the pulsed laser beam 112 approaches a more nearly perfectly non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams 112.

Referring now to FIG. 3, an optical assembly 100 for producing a pulsed laser beam 112 that that is quasi-non-diffracting and forms the pulsed laser beam focal line 113 at the transparent mother sheet 160 using the aspheric optical element 120 (e.g., an axicon 122) is schematically depicted. The optical assembly 100 includes a beam source 110 that outputs the pulsed laser beam 112, and a first and second lens 130, 132.

Further, the transparent mother sheet 160 may be positioned such that the pulsed laser beam 112 output by the beam source 110 irradiates the transparent mother sheet 160, for example, after traversing the aspheric optical element 120 and thereafter, both the first lens 130 and the second lens 132. An optical axis 102 extends between the beam source 110 and the transparent mother sheet 160 along the Z-axis such that when the beam source 110 outputs the pulsed laser beam 112, the beam pathway 111 of the pulsed laser beam 112 extends along the optical axis 102. As used herein "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

Referring still to FIG. 3, the beam source 110 may comprise any known or yet to be developed beam source 110 configured to output pulsed laser beams 112. In operation, the defects 172 of the closed contour 170 (FIGS. 1A and 2) are produced by interaction of the transparent mother sheet 160 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form defects 172 in the transparent mother sheet 160 may be well suited for materials that are transparent to the selected pulsed laser wavelength.

Suitable laser wavelengths for forming defects 172 are wavelengths at which the combined losses of linear absorption and scattering by the transparent mother sheet 160 are sufficiently low. In embodiments, the combined losses due to linear absorption and scattering by the transparent mother sheet 160 at the wavelength are less than 20%/mm, or less than 15%/mm, or less than 10%/mm, or less than 5%/mm, or less than 1%/mm, where the dimension "/mm" means per millimeter of distance within the transparent mother sheet 160 in the beam propagation direction of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the pulsed laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the one or more closed contours 170 (FIGS. 1A and 2) may utilize the beam source 110 (e.g., an ultra-short pulse laser) in combination with the aspheric optical element 120, the first lens 130, and the second lens 132, to project the beam spot 114 on the transparent mother sheet 160 and generate the pulsed laser beam focal line 113. The pulsed laser beam focal line 113 comprises a quasi-non-diffracting beam, such as a Gauss-Bessel beam or Bessel beam, as defined above, and may fully perforate the transparent mother sheet 160 to form defects 172 in the transparent mother sheet 160, which may form the closed contour 170. In some embodiments, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring also to FIGS. 4A and 4B, in addition to a single pulse operation at the aforementioned individual pulse repetition rates, the pulses may be produced in pulse bursts 500 of two pulses 500A (e.g., sub-pulses) or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent mother sheet 160) on a time scale not easily accessible using a single-pulse operation. While still not intending to be limited by theory, the energy within a pulse burst (i.e. a group of pulses) is conserved. As an illustrative example, for a pulse burst having an energy of 100 μJ/burst and 2 sub-pulses, the 100 μJ/burst energy is split between the 2 pulses for an average energy of 50 μJ per sub-pulse and for a pulse burst having an energy of 100 μJ/burst and 10 sub-pulses, the 100 μJ/burst is split amongst the 10 sub-pulses for an average energy of 10 μJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent mother sheet 160.

While still not intending to be limited by theory, when the defects 172 of the one or more closed contours 170 are formed with pulse bursts having at least two sub-pulses, the force necessary to separate the transparent mother sheet 160 along is closed contour 170 (i.e. the maximum break resistance) is reduced compared to the maximum break resistance of a closed contour 170 of the same shape with the same spacing between adjacent defects 172 in an identical transparent mother sheet 160 that is formed using a single pulse laser. For example, the maximum break resistance of a closed contour 170 formed using a single pulse is at least two times greater than the maximum break resistance of a closed contour 170 formed using a pulse burst having 2 or more sub-pulses. Further, the difference in maximum break resistance between a closed contour 170 formed using a single pulse and a closed contour 170 formed using a pulse burst having 2 sub-pulses is greater than the difference in maximum break resistance between a closed contour 170 formed using a pulse burst having 2 sub-pulses and a pulse burst having 3 sub-pulses. Thus, pulse bursts may be used to form closed contours 170 that separate easier than closed contours 170 formed using a single pulse laser.

Referring still to FIGS. 4A and 4B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 4B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 4B) is about 5 microseconds for the beam source 110 outputting a pulsed laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent mother sheet 160 being operated on such that the material of the transparent mother sheet 160 is substantially transparent at the wavelength. The average laser power per burst measured at the material may be at least about 40 μJ per mm of thickness of material. For example, in embodiments, the average laser power per burst may be from about 40 μJ/mm to about 2500 μJ/mm, or from about 500 μJ/mm to about 2250 μJ/mm. In a specific example, for 0.5 mm to 0.7 mm thick Corning EAGLE XG® transparent workpiece, pulse bursts of from about 300 μJ to about 600 μJ may cut and/or separate the workpiece, which corresponds to an exemplary range of about 428 μJ/mm to about 1200 μJ/mm (i.e., 300 μJ/0.7 mm for 0.7 mm EAGLE XG® glass and 600 μJ/0.5 mm for a 0.5 mm EAGLE XG® glass).

The energy required to modify the transparent mother sheet 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 μJ to about 750 μJ, e.g., from about 50 μJ to about 500 μJ, or from about 50 μJ to about 250 J. For some glass compositions, the pulse energy (e.g., pulse burst energy) may be from about 100 μJ to about 250 μJ. However, for display or TFT glass compositions, the pulse energy (e.g., pulse burst energy) may be higher (e.g., from about 300 μJ to about 500 μJ, or from about 400 μJ to about 600 μJ, depending on the specific glass composition of the transparent mother sheet 160).

Figure 5A:
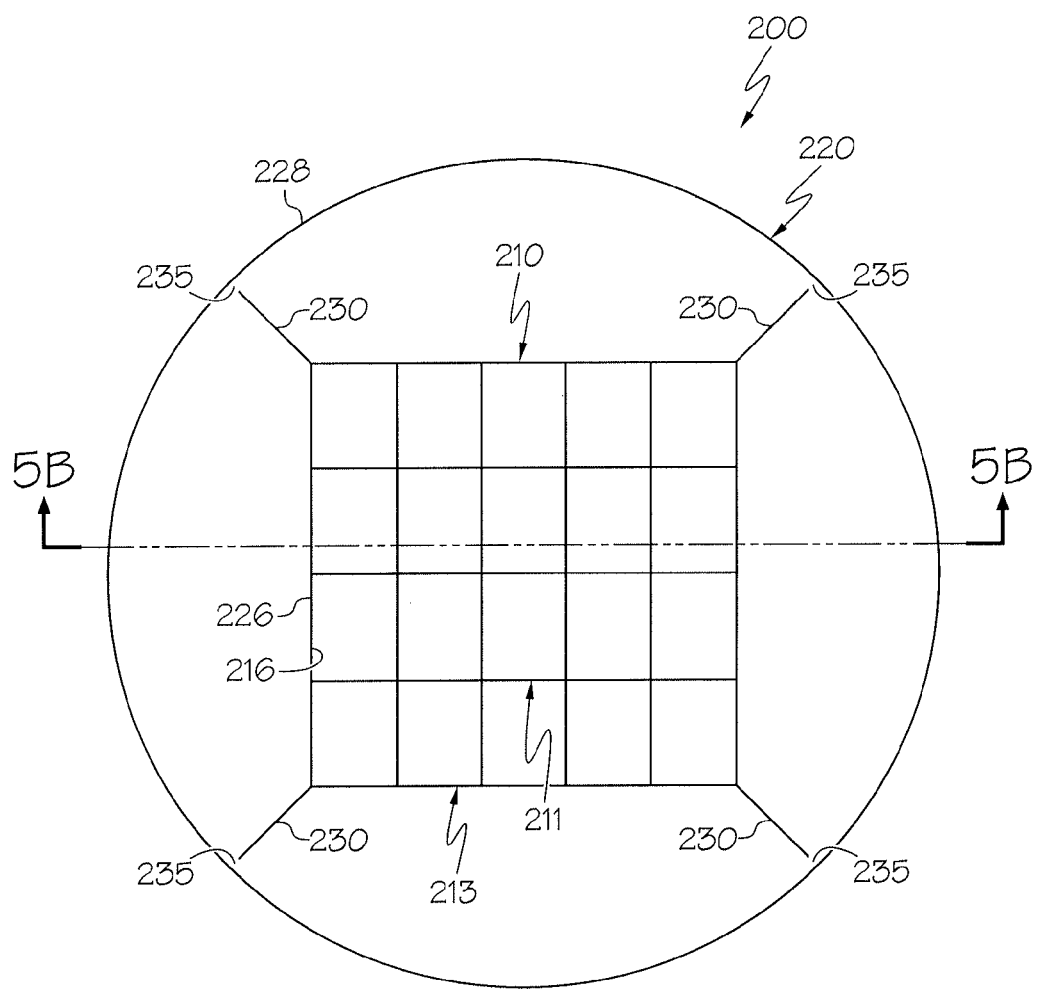
FIG. 5A schematically depicts a transparent workpiece assembly comprising transparent articles in direct frictional engagement with other transparent articles and a frame portion surrounding the transparent articles, according to one or more embodiments described herein.

While not intending to be limited by theory, the use of a pulsed laser beam 112 capable of generating pulse bursts is advantageous for cutting or modifying transparent materials, for example glass (e.g., the transparent mother sheet 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent mother sheet 160 along the one or more closed contours 170 to form the transparent articles 210 (FIG. 5), thereby minimizing crack formation in the transparent articles 210 (FIG. 5). Further, using a pulse burst to form defects 172 increases the randomness of the orientation of cracks extending outward from each defect 172 into the bulk material of the transparent mother sheet 160 such that individual cracks extending outward from defects 172 do not influence or otherwise bias the separation of the closed contour 170 to form the corresponding transparent article 210 (FIG. 5A) such that separation of the defects 172 follows the closed contour 170, minimizing the formation of cracks extending into the transparent articles 210 and the remaining transparent mother sheet 160 (i.e. the frame portion 220 of the transparent mother sheet 160).

Referring again to FIG. 3, the aspheric optical element 120 is positioned within the beam pathway 111 between the beam source 110 and the transparent mother sheet 160. In operation, propagating the pulsed laser beam 112, e.g., an incoming Gaussian beam, through the aspheric optical element 120 may alter the pulsed laser beam 112 such that the portion of the pulsed laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens (e.g., negative axicon), a positive refractive axicon lens, a reflective axicon lens, a diffractive axicon lens, a programmable spatial light modulator axicon lens (e.g., a phase axicon), or the like.

In some embodiments, the aspheric optical element 120 comprises at least one aspheric surface whose shape is mathematically described as: $z'=(cr^2/1)+(1-(1+k)(c^2r^2))^{1/2}+(a_1r+a_2r^2+a_3r^3+a_4r^4+a_5r^5+a_6r^6+a_7r^7+a_8r^8+a_9r^9+a_{10}r^{10}+a_{11}r^{11}+a_{12}r^{12}$ where $z'$ is the surface sag of the aspheric surface, r is the distance between the aspheric surface and the optical axis 102 in a radial direction (e.g., in an X-direction or a Y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1$-$a_7$, respectively: $-0.085274788$; $0.065748845$; $0.077574995$; $-0.054148636$; $0.022077021$; $-0.0054987472$; $0.0006682955$; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2, a_3 \ldots, a_{12} \neq 0$). In one example embodiment, the aspheric optical element 120 comprises a third-order aspheric optical element such as a cubically shaped optical element, which comprises a coefficient $a_3$ that is non-zero.

In some embodiments, when the aspheric optical element 120 comprises an axicon 122 (as depicted in FIG. 3), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the pulsed laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming pulsed laser beam 112 (e.g., an incoming Gaussian beam) into a quasi-non-diffracting beam, which, in turn, is directed through the first lens 130 and the second lens 132.

Referring still to FIG. 3, the first lens 130 is positioned upstream the second lens 132 and may collimate the pulsed laser beam 112 within a collimation space 134 between the first lens 130 and the second lens 132. Further, the second lens 132 may focus the pulsed laser beam 112 into the transparent mother sheet 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Referring now to FIGS. 5A-8E, the formation of transparent articles from a transparent mother sheet will now be described in more detail. In particular, FIGS. 5A-7B depicts transparent workpiece assemblies comprising transparent articles and a frame portion formed from a transparent mother sheet. Further, FIGS. 8A-8E depict steps of laser processing a transparent mother sheet to form one or more transparent articles from the transparent mother sheet.

Referring now to FIG. 5A, after one or more transparent articles 210 are separated from a transparent mother sheet (such as the transparent mother sheet 160 depicted in FIGS. 1A-3 or the transparent mother sheet 360 depicted in FIG. 8A-8C), what was a single transparent mother sheet now comprises a transparent workpiece assembly 200 that includes the one or more transparent articles 210 and a frame portion 220 that surrounds the one or more transparent articles 210. In various embodiments described herein, the frame portion 220 may also be referred to as the remaining portion of the transparent mother sheet or the frame portion of the transparent mother sheet.

Figure 5B:
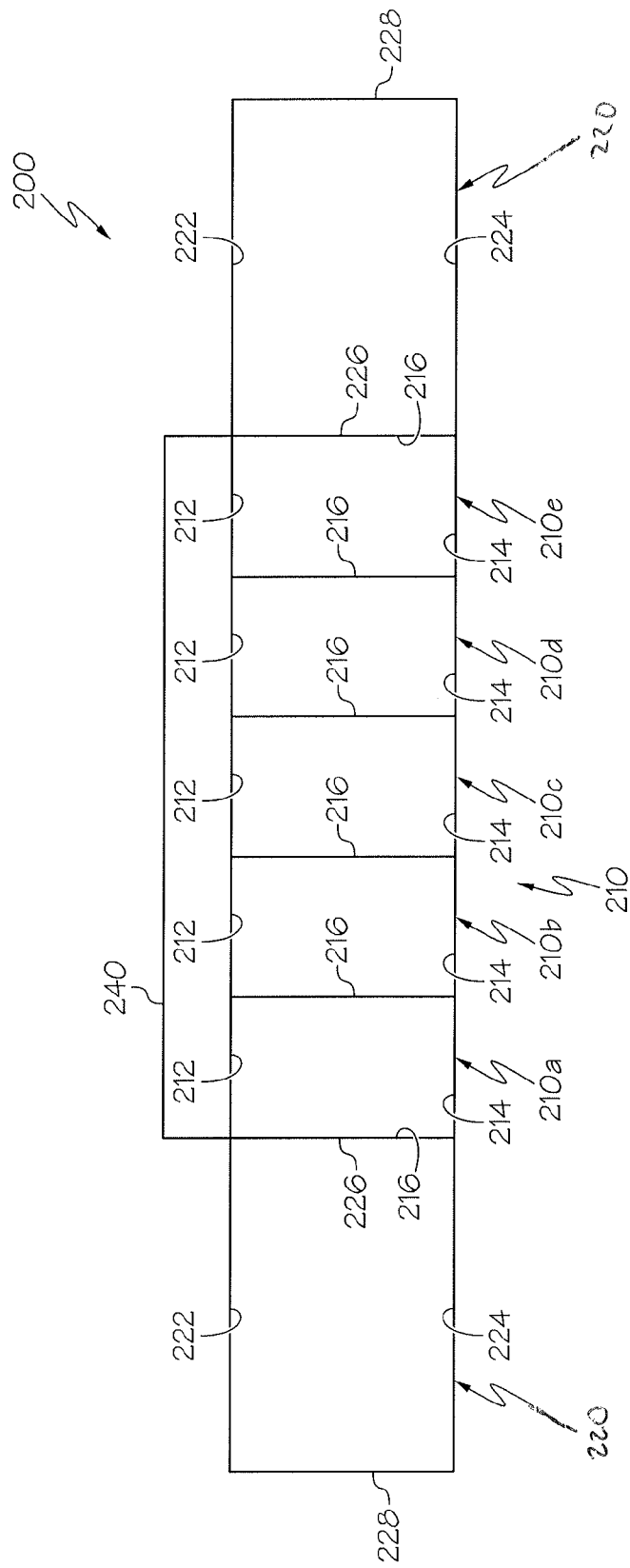
FIG. 5B is a cross-sectional view of the transparent workpiece assembly of FIG. 5A, according to one or more embodiments described herein.

As depicted in FIG. 5B, which is a cross sectional view of the transparent workpiece assembly 200 of FIG. 5A, each of the one or more transparent articles 210 comprise a first major surface 212 and a second major surface 214, which may be opposite the first major surface 212. Further, the one or more transparent articles 210 each comprise one or more side surfaces 216 extending between the first major surface 212 and the second major surface 214. Further, the frame portion 220 comprises a first major surface 222 and a second major surface 224, which may be opposite the first major surface 222. The frame portion 220 also comprises one or more inner surfaces 226 and an outer surface 228. In particular, the outer surface 228 of the frame portion 220 is the same surface as the perimeter surface of the transparent mother sheet from which the transparent articles 210 are separated. Further, at least one of the one or more transparent articles 210 are frictionally engaged with at least one of the one or more inner surfaces 226 of the frame portion 220 to retain each of the one or more transparent articles 210 in engagement with the frame portion 220. For example, at least one of the one or more side surfaces 216 of at least one of the one or more transparent articles 210 may be directly frictionally engaged with an inner surface 226 of the frame portion 220. These interfaces of frictional engagement between adjacent transparent articles and/or a transparent article and the frame portion are referred to herein as "separated contours." Moreover, as used herein, a separated contour is associated with a particular transparent article if that separated contour forms an interface of frictional engagement between the particular transparent article and an another transparent article, a frame portion, or both.

As depicted in FIGS. 5A and 5B, the transparent workpiece assembly 200 may comprise multiple transparent articles 210, for example, a first transparent article 210*a*, a second transparent article 210*b*, a third transparent article 210*c*, a fourth transparent article 210*d*, and a fifth transparent article 210*e*. In some embodiments, the one or more transparent articles 210 may comprise an inner array 211 of transparent articles 210 and an outer array 213 of transparent articles 210. Each transparent article 210 of the outer array 213 is in frictional engagement with the frame portion 220 and each transparent article 210 of the inner array 211 is separated from the frame portion 220 by at least one transparent article 210 of the outer array 213. Further, at least one of the transparent articles 210 of the inner array of 211 is in frictional engagement with a transparent article 210 of the outer array 213. In the embodiment depicted in FIGS. 5A and 5B, the first transparent article 210*a* and the fifth transparent article 210*e* are part of the outer array 213 and are frictionally engaged with the frame portion 220 and the second, third, and fourth transparent articles 220*b*-220*d* are part of the inner array 221. The second transparent article 210*b* is positioned between and frictionally engaged with the first transparent article 210*a* and the third transparent article 210*c* and the fourth transparent article 210*d* is positioned between and frictionally engaged with the third transparent article 210*c* and the fifth transparent article 210*e*. Moreover, in some embodiments, the inner array 211 may include at least one transparent article 210 that is frictionally engaged with only other transparent articles 210 of the inner array 211.

Figure 6A:
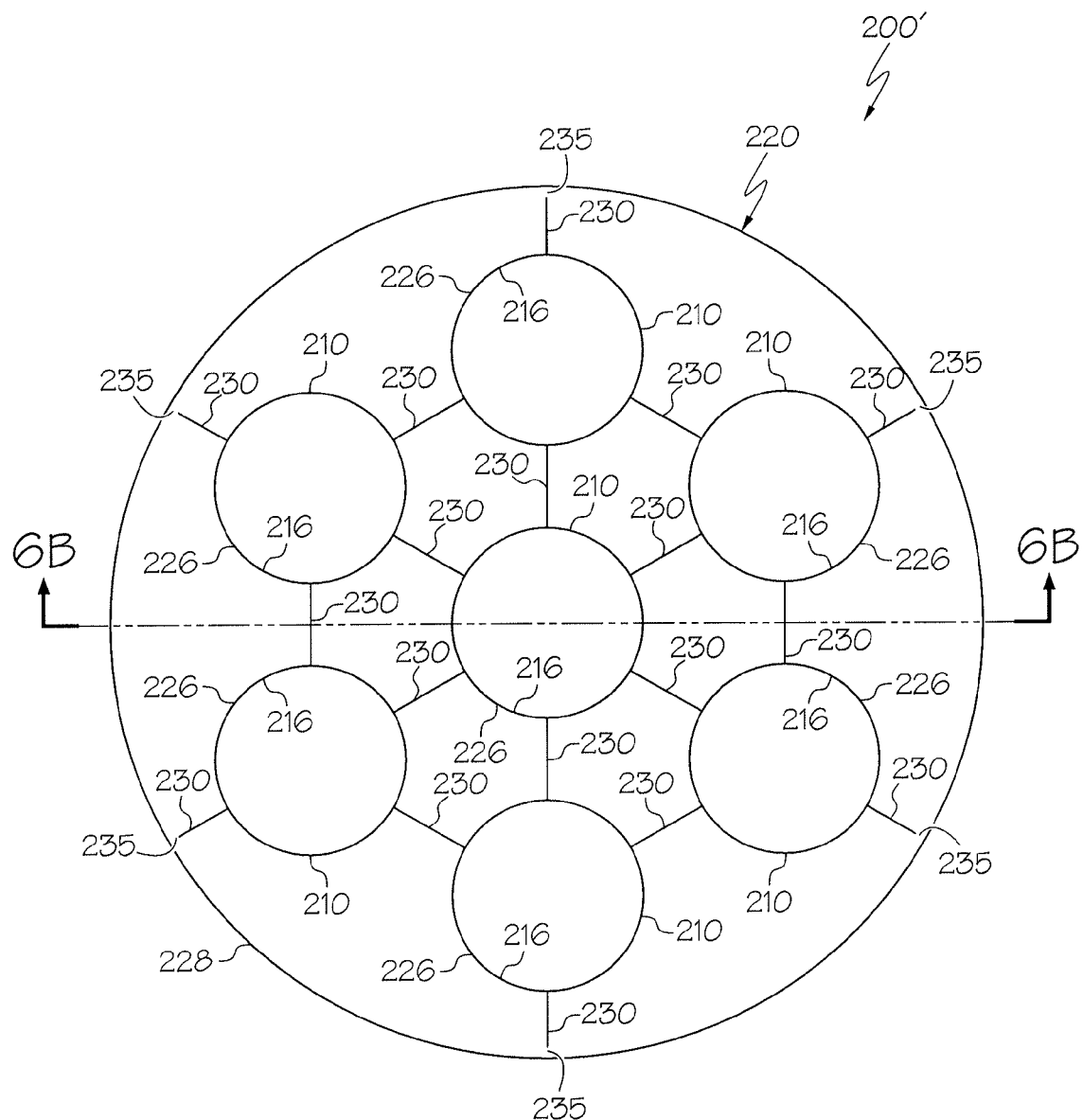
FIG. 6A schematically depicts a transparent workpiece assembly comprises transparent articles and a frame portion in direct frictional engagement with each of the transparent articles, according to one or more embodiments described herein.
Figure 6B:
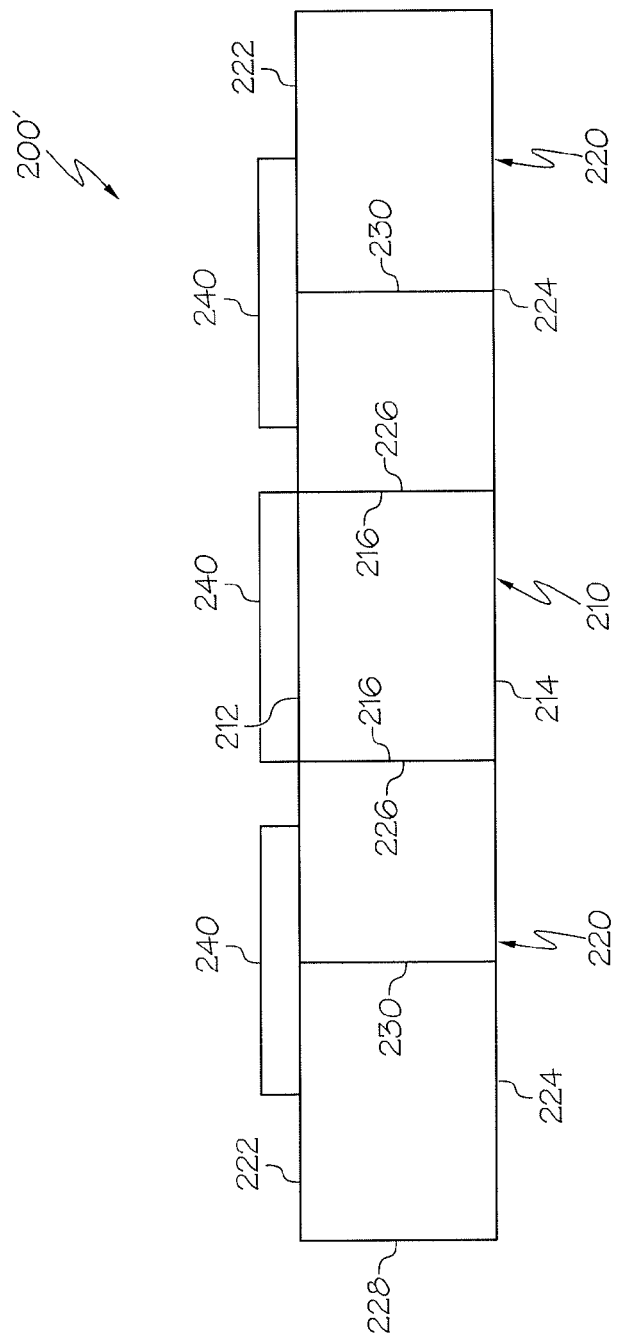
FIG. 6B is a cross-sectional view of the transparent workpiece assembly of FIG. 6A, according to one or more embodiments described herein.

Referring now to FIGS. 6A and 6B, a transparent workpiece assembly 200' is depicted. As shown in FIG. 6A, the transparent workpiece assembly 200' comprises multiple transparent articles 210 that are each separated from one another by a portion of the frame portion 220. As depicted in FIG. 6B, which is a cross sectional view of the transparent workpiece assembly 200' of FIG. 6A, each of the one or more transparent articles 210 comprises a first major surface 212 and a second major surface 214, which may be opposite the second major surface 214. Further, the one or more transparent articles 210 each comprise one or more side surfaces 216 that are frictionally engaged with an inner surface 226 of the frame portion 220. While not depicted in the embodiments of FIGS. 5A-6B, the transparent articles 210 may be in contact with each other and in contact with discrete portions of the transparent workpiece assembly 200 between the transparent articles 210 that are not part of the frame portion 220, for example, in embodiments in which the transparent articles 210 comprise rounded rectangles).

While also not depicted in FIGS. 5A-6B, embodiments are contemplated in which some of the transparent articles 210 are frictionally engaged with other transparent articles 210 (similar to FIGS. 5A and 5B) and some of the transparent articles 210 are frictionally engaged with only the frame portion 220 (similar to FIGS. 6A and 6B).

Referring now to FIGS. 5A-6B, the transparent workpiece assembly 200, 200' may also comprise one or more release lines 230 disposed within the frame portion 220. The release lines 230 may be formed by first laser forming a plurality of defects (similar to the defects 172 of FIGS. 1A and 2) in the frame portion 220 and thereafter separating the frame portion 220 along the release lines 230. In some embodiments, the release lines 230 may extend between the transparent articles 210 and the outer surface 228 of the frame portion 220, for example, as depicted in FIGS. 5A and 5B. Further, as depicted in FIG. 6A, release lines 230 may also extend between transparent articles 210. In operation, separating the frame portion 220 along the one or more release lines 230 (for example, by directing an infrared laser beam along or near the release lines 230, applying a mechanical force to the release lines 230, or the like) may release the transparent articles 210 from frictional engagement and with the frame portion 220, thereby removing the transparent articles 210 from contact with the frame portion 220.

In some embodiments, at least one release line 230 may extend toward the outer surface 228 without reaching the outer surface 228 such that at least one release line 230 is separated from the outer surface 228 by a notch portion 235. The notch portion 235 comprises a solid portion of the frame portion 220 positioned between a release line 230 and the outer surface 228. In some embodiments, the notch portion 235 extends from the outer surface 228 to at least one release line 230 and in some embodiments, a release line 230 may extend from the outer surface 228 to a notch portion 235, and another release line 230 may extend from this notch portion 235 to the inner surface 226 of the frame portion 220.

In operation, by forming one or more release lines 230 while leaving a notch portion 235 between the release line 230 and the outer surface 228, the frame portion 220 may be separated along the release lines 230 (for example, by directing an infrared laser beam along or near the release lines 230, applying a mechanical force to the release lines 230, or the like) without releasing the transparent articles 210 from frictional engagement with the frame portion 220. This allows the release lines 230 to be separated during the same operational step that the closed contours 170 are separated (e.g., using the same or similar manufacturing equipment) without releasing the transparent articles 210 from frictional engagement with the frame portion 220.

Figure 7A:
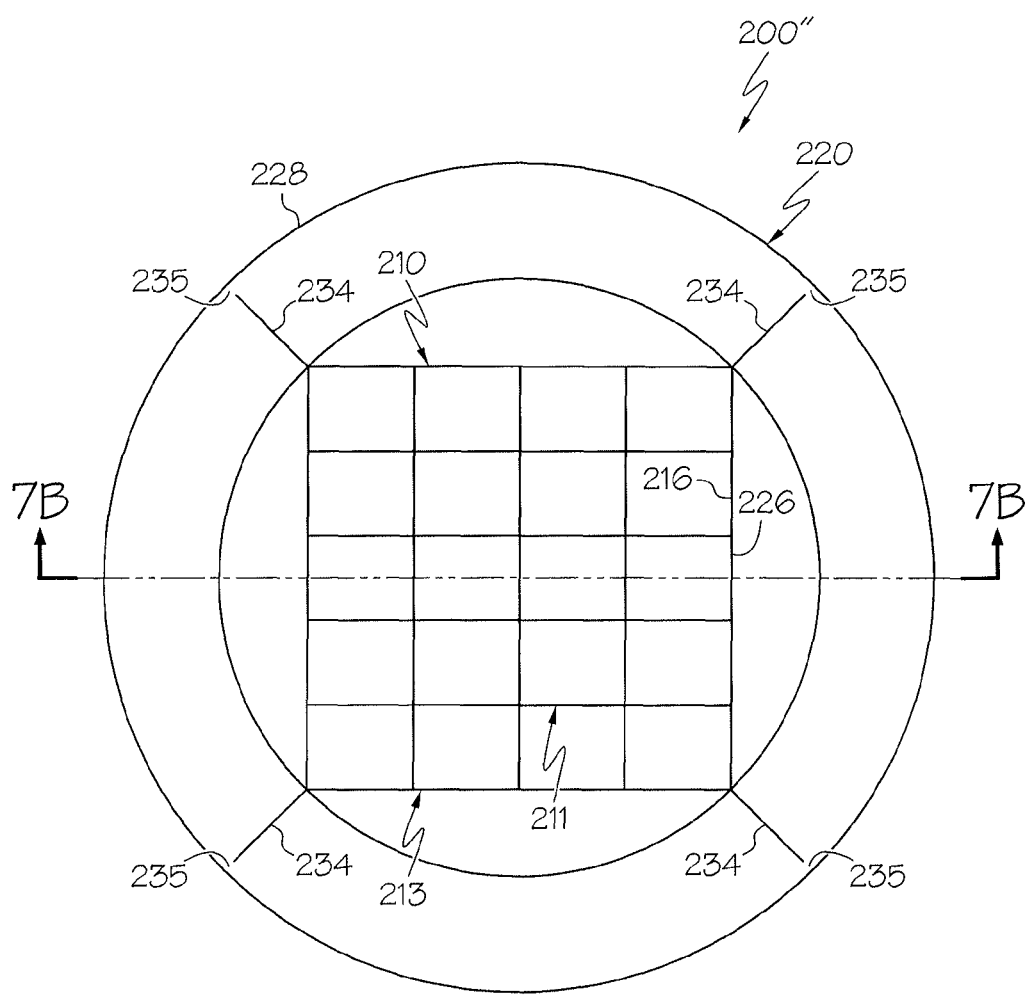
FIG. 7A schematically depicts a transparent workpiece assembly comprising transparent articles, a frame portion surrounding the transparent articles and a release perimeter formed in the frame portion, according to one or more embodiments described herein.
Figure 7B:
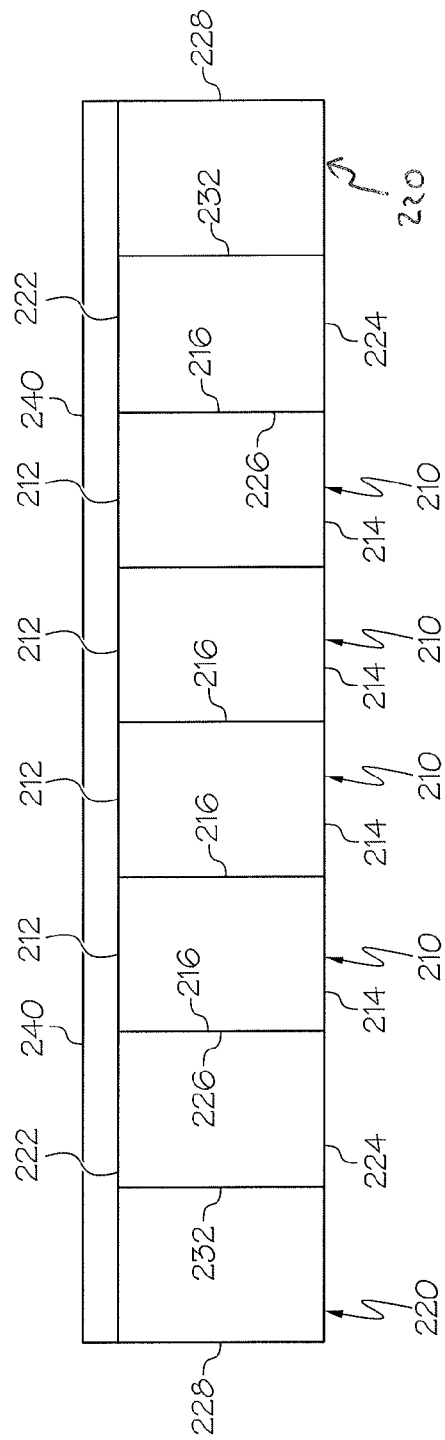
FIG. 7B is a cross-sectional view of the transparent workpiece assembly of FIG. 7A, according to one or more embodiments described herein.

Referring now to FIGS. 7A and 7B, a transparent workpiece assembly 200'' comprising transparent articles 210, a frame portion 220, and release lines 230 that comprise a release perimeter 232 and one or more release spurs 234 is schematically depicted. The release perimeter 232 is disposed in the frame portion 220 and circumscribes the one or more transparent articles 210. The release perimeter 232 contacts at least one of the one or more inner surfaces 226 of the frame portion 220 and surrounds the transparent articles 210. The release spurs 234 extend from the release perimeter 232 toward the outer surface 228. In some embodiments, the one or more release spurs 234 extend from the release perimeter 232 to the outer surface 228. In other embodiments, the one or more release spurs 234 may extend from the release perimeter 232 and a notch portion 235 may be positioned between the release perimeter 232 and the outer surface 228 such that the notch portion 235 separates a release spur 234 from the outer surface 228. For example, in some embodiments, a notch portion 235 may extend between the outer surface 228 and a release spur 234 and in some embodiments, a release spur 234 may extend from the outer surface 228 to a notch portion 235, and another release line 230 may extend from this notch portion 235 to the release perimeter 232 the frame portion 220. In other embodiments, the release lines 230 may include a release perimeter 232 and not include the release spurs 234. Moreover, while not depicted, some embodiments of the transparent workpiece assembly 200' in FIGS. 6A and 6B may include a release perimeter 232 that contacts at least one of the transparent articles 210 and surrounds the one or more transparent articles 210.

In operation, separating the release perimeter 232 and the release spurs 234 (for example, by directing an infrared laser beam along or near the release perimeter 232 and the release spurs 234, applying a mechanical force to the release perimeter 232 and the release spurs 234, or the like) allows the one or more transparent articles 210 to be removed from frictional engagement with the frame portion 220 by subsequent application of force to the frame portion 220, for example to one or more notch portions 235. Alternatively, in embodiments of the transparent workpiece assembly 200" without notch portions 235, separating the release perimeter 232 and the release spurs 234 may remove the transparent articles 210 from frictional engagement with the frame portion 220. Further, in embodiments without the release spurs 234, the one or more transparent articles 210 may be removed from frictional engagement with the frame portion 220 by application of force to the frame portion 220 to propagate a crack between the outer surface 228 of the frame portion 220 and the release perimeter 232.

Referring again to FIGS. 5A-7B, the transparent workpiece assemblies 200, 200', 200" may further comprise one or more layers of material 240 disposed on one or both of the first major surface 212 and the second major surface 214 of at least one of the transparent articles 210. For example, as depicted in FIGS. 5B, 6B, and 7B, the material 240 is disposed on the first major surface 212 of each of the transparent articles 210 of the transparent workpiece assembly 200. In some embodiments, the material 240 may additionally be disposed on the frame portion 220, for example, one or both of the first major surface 222 and the second major surface 224 of the frame portion 220. While not intending to be limited by theory, by retaining the transparent articles 210 in frictional engagement with the frame portion 220, the one or more layers of material 240 may be applied to the multiple transparent articles 210 in a single process step. In this embodiment, the one or more layers of material 240 disposed on the first major surface 212 of at least one transparent article 210 and disposed contiguously over at least one separated contour associated with the at least transparent article 210. As one example, the one or more layers of material 240 may disposed on a first major surface 212 a first transparent article 210a, a first major surface 212 of a second transparent article 210b, and disposed contiguously over a separated contour that forms an interface between the first transparent article 210a and the second transparent article 210b. As another example, the one or more layers of material 240 may disposed on a first major surface 212 a first transparent article 210a, a first major surface 222 of the frame portion 220, and disposed contiguously over a separated contour that forms an interface between the first transparent article 210a and the frame portion 220. Furthermore, it may be easier to apply the material 240 to the larger transparent workpiece assembly 200, 200', 200" than to apply the material 240 to smaller individual transparent articles 210.

In some embodiments, the one or more layers of material 240 may comprise a metallization layer, an anti-reflective coating, or the like. Further, the one or more layers of material 240 may comprise a glass, glass-ceramic, ceramic, a polymer, combinations thereof, or the like. For example, the one or more layers of material 240 may comprise one or more sheets of glass bonded to the transparent workpiece assembly 200, for example, bonded to at least one of the one or more transparent articles 210. In operation, the release lines 230 allow the one or more layers of material 240 to be applied to the transparent articles 210 before the transparent articles 210 are released from frictional engagement with the frame portion 220. Moreover, the notch portions 235 allow the one or more layers of material 240 to be applied after the release lines 230 are released because the notch portions 235 only require a small, localized force (such as a mechanical force) to break, thereby releasing the transparent articles 210 from frictional engagement with the frame portion 220. Further, because material 240 may be applied after the release lines 230 are released, the material 240 may be applied to an entire surface of the transparent workpiece assembly 200, 200', which may be easier than selectively applying the material 240 to the transparent articles 210. One example method of applying the material 240 to an entire surface of the transparent workpiece assembly 200, 200' includes spin coating.

In some embodiments, the transparent mother sheet 160 comprises a first transparent mother sheet and at least one of the one or more layers of material 240 may comprise a second transparent mother sheet. While the laser processes described herein may be used to perforate (i.e. form defects within) stacks of transparent mother sheets, such as stacks of sheets of glass, and may be used to fully perforate glass stacks of up to a few mm total height with a single laser pass, there may be situations in which it is not advantageous to simultaneously perforate multiple transparent mother sheets. As one example, embodiments in which a metal component (such as an electrical connector) is positioned on at least one transparent mother sheet, it may be advantageous to not laser form defects in transparent mother sheet (e.g., in the first and second transparent mother sheets) in the same operation (i.e., while stacked), because the laser beam focal line would be scattered, blocked or otherwise disrupted by the metal component. As another example, embodiments in which the contours of defects and subsequently formed transparent articles and frame portion of different transparent mother sheets (e.g., the first and second transparent mother sheet) are not aligned it may be advantageous to separately laser form defects in each transparent mother sheet (e.g., in the first and second transparent mother sheets), so that contours and subsequent transparent articles and a frame portion of different shapes and sizes may be formed.

In some embodiments, the second transparent mother sheet may comprise one or more contours, such as one or more closed contours, each comprising a plurality of defects, which may comprise any of the embodiments of contours and defects described herein and the second transparent mother sheet may comprise any of the embodiments of the transparent mother sheet 160 described herein. In this embodiments, the one or more closed contours of the second transparent mother sheet are not aligned with the one or more closed contours of the first transparent mother sheet such that simultaneous laser formation of contours of defects in both the first and second transparent workpiece is unfeasible. Furthermore, in some embodiments, the second transparent mother sheet may be stacked into an assembly with the transparent articles 210 and the frame portion 220 (formed from the first transparent mother sheet 160) before releasing the closed contours of the second transparent mother sheet. In other embodiments, the one or more closed contours of the second transparent mother sheet may be separated before the second transparent mother sheet is stacked into an assembly with the transparent articles 210 and the frame portion 220 (formed from the first transparent mother sheet 160). In this embodiment, the second transparent mother sheet comprises one or more transparent articles and a frame portion, that surrounds the one or more transparent articles and is in frictional engagement with the one or more transparent articles, that are aligned with the one or more transparent articles 210 and the frame portion 220 formed from the first transparent mother sheet 160. In this embodiment, the frame portion of the second transparent mother sheet (i.e., formed from the second transparent mother sheet) may have notch portions that may retain the transparent articles and frame portion of the second transparent mother sheet in frictional engagement and may be released in the same manner as the notch portions of the first transparent mother sheet.

In some embodiments, the first transparent mother sheet (i.e. the transparent articles 210 and the frame portion 220) may be bonded to the second transparent mother sheet, for example, directly bonded. Alternatively, additional layers of material 240 may be disposed between the first transparent mother sheet (i.e. the transparent articles 210 and the frame portion 220) and the second transparent mother sheet, for example, a metallization layer a polymer layer, a ceramic layer, a glass layer (e.g., a glass layer that is not the second transparent mother sheet), a glass-ceramic layer, or the like, that are disposed between the first transparent mother sheet and the second transparent mother sheet. Thus, the laser processes described herein facilitate the formation of well-aligned stacked assemblies of transparent articles and additional layers of material. Furthermore, forming stacked assemblies before releasing the transparent articles 210 from frictional engagement with the frame portion 220 may facilitate faster and more reliable formation of stacked assemblies that include at least one transparent article 210.

Figure 8A:
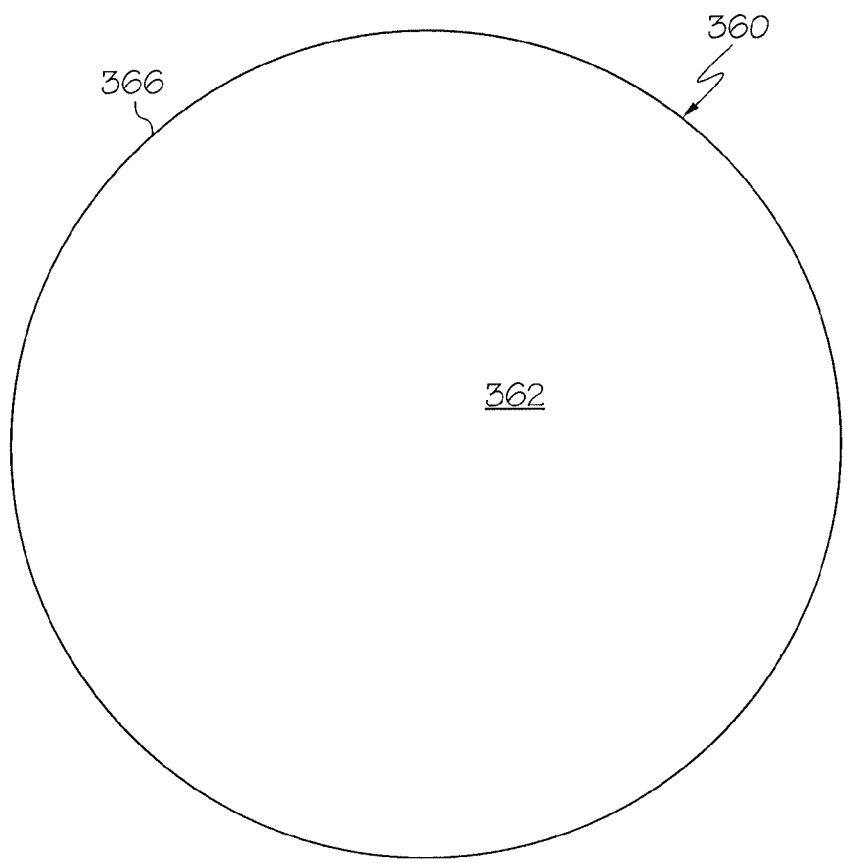
FIG. 8A schematically depicts a transparent mother sheet, according to one or more embodiments described herein.
Figure 8B:
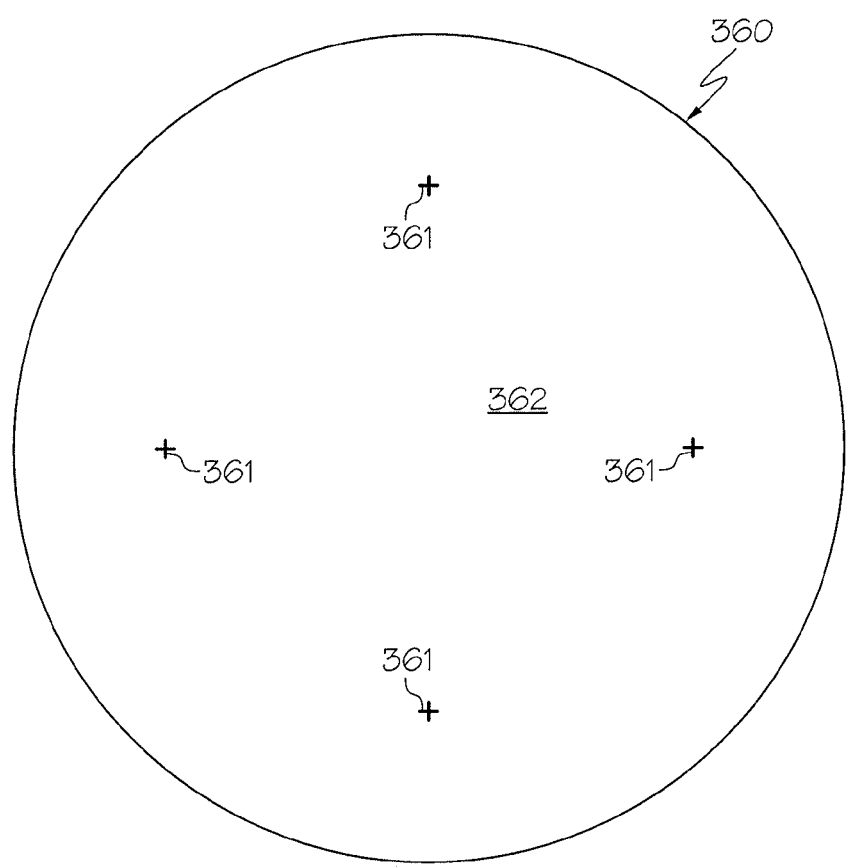
FIG. 8B schematically depicts the transparent mother sheet of FIG. 8A having fiducials formed thereon, according to one or more embodiments described herein.
Figure 8C:
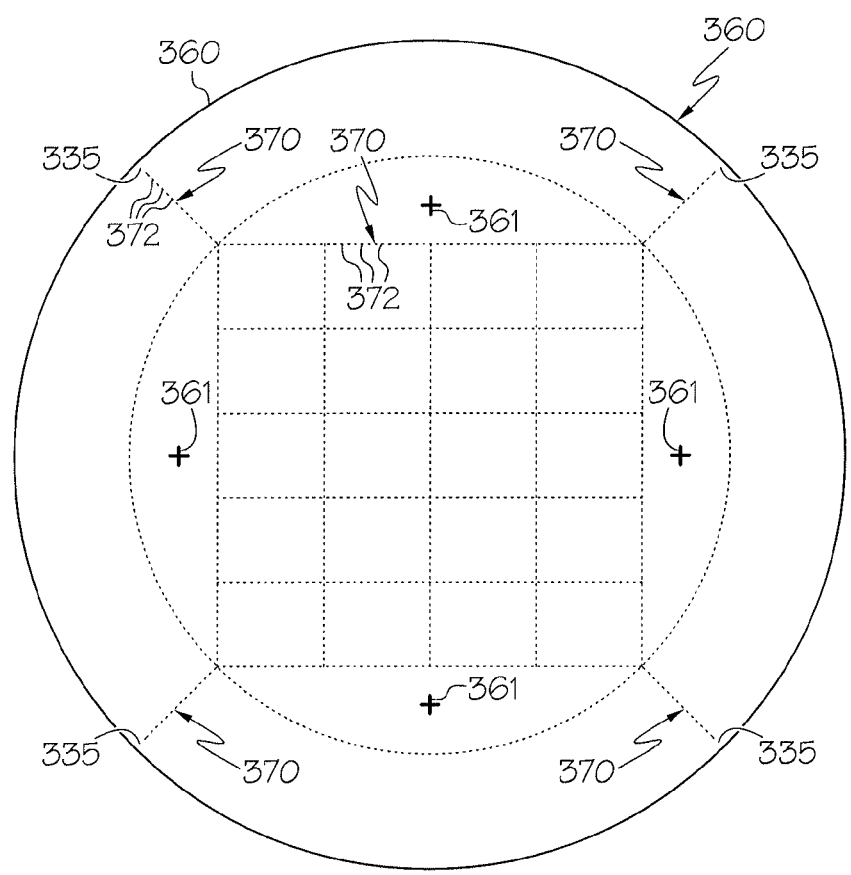
FIG. 8C schematically depicts the transparent mother sheet of FIG. 8B having contours of defects formed therein, according to one or more embodiments described herein.
Figure 8D:
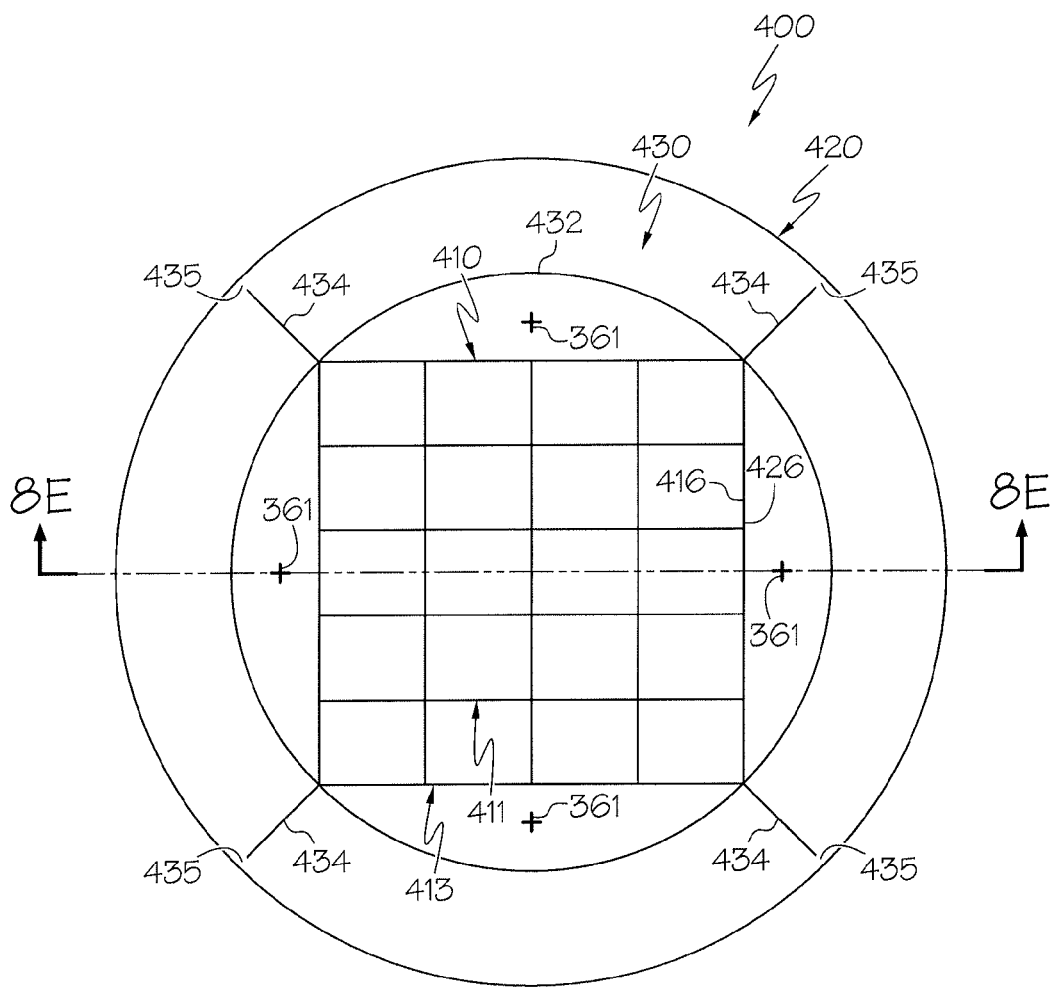
FIG. 8D schematically depicts a transparent workpiece assembly comprising transparent articles and a frame portion formed from the transparent mother sheet of FIG. 8C, according to one or more embodiments described herein.
Figure 8E:
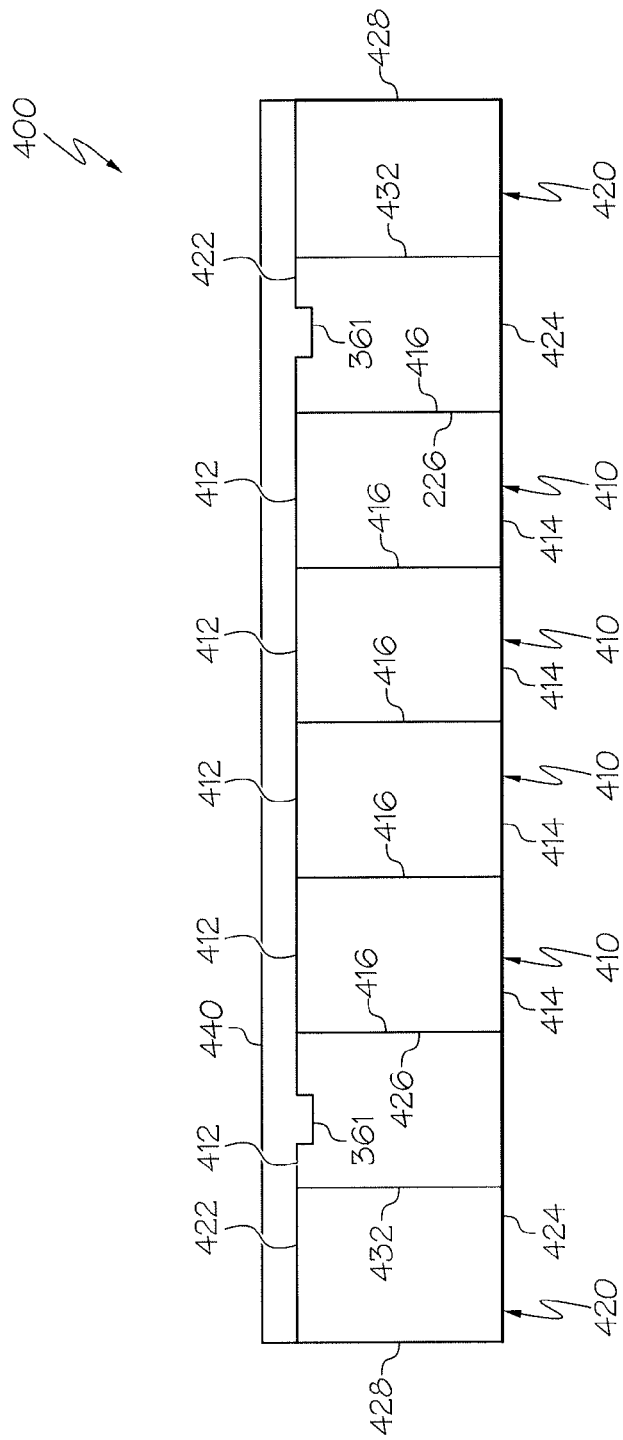
FIG. 8E is a cross-sectional view of the transparent workpiece assembly of FIG. 8D, according to one or more embodiments described herein.

Referring now to FIGS. 8A-8E, a method of processing a transparent mother sheet 360, for example, by laser forming transparent articles 410 from the transparent mother sheet 360 and processing the transparent articles 410 in-situ is schematically depicted. As depicted in FIGS. 8A and 8B, the method comprises first providing the transparent mother sheet 360 (FIG. 8A) and in some embodiments forming one or more fiducials 361 in the transparent mother sheet 360 (FIG. 8B). The fiducials 361 comprise a marking formed on or in the transparent mother sheet 360, for example in or on a first major surface 362 of the transparent mother sheet 360. The fiducials 361 provide points of reference to assist in the later processing steps of the transparent mother sheet 360, facilitating alignment. Further, as depicted in FIGS. 8C-8E, the fiducials 361 may be formed in the portion of the transparent mother sheet 360 that becomes a frame portion 420 after formation of one or more transparent articles 410 from the transparent mother sheet 360.

Referring now to FIGS. 1A-3 and 8A-8E, the method of processing the transparent mother sheet 360 comprises forming one or more contours 370 (such as closed contours, for example, the closed contours 170 of FIGS. 1A and 2) comprising defects 372 (for example, the defects 172 of FIGS. 1A and 2) in the transparent mother sheet 360. For example, some of the contours 370 (e.g., the closed contours) may define perimeters 415 of one or more transparent articles 410 and some of the contours 370 may be formed into release lines 430. In operation, forming the contours 370 comprising defects 372 includes directing (e.g., localizing) the pulsed laser beam 112 oriented along a beam pathway 111 and output by a beam source 110 into the transparent mother sheet 360 such that the portion of the pulsed laser beam 112 directed into the transparent mother sheet 360 generates an induced absorption within the transparent mother sheet 360 and the induced absorption produces a defect 372 within the transparent mother sheet 360.

The pulsed laser beam 112 may comprise a pulse energy and a pulse duration sufficient to exceed a damage threshold of the transparent mother sheet 360. In some embodiments, directing the pulsed laser beam 112 into the transparent mother sheet 360 comprises focusing the pulsed laser beam 112 output by the beam source 110 into the pulsed laser beam focal line 113 oriented along the beam propagation direction (e.g., the Z axis). The transparent mother sheet 360 is positioned in the beam pathway 111 to at least partially overlap the pulsed laser beam focal line 113 of pulsed laser beam 112. The pulsed laser beam focal line 113 is thus directed into the transparent mother sheet 360. The pulsed laser beam 112, e.g., the pulsed laser beam focal line 113 generates induced absorption within the transparent mother sheet 360 to create the defect 372 in the transparent mother sheet 360. In some embodiments, individual defects 372 may be created at rates of several hundred kilohertz (i.e., several hundred thousand defects per second). In some embodiments, the aspheric optical element 120 may focus the pulsed laser beam 112 into the pulsed laser beam focal line 113. In operation, the position of the pulsed laser beam focal line 113 may be controlled by suitably positioning and/or aligning the pulsed laser beam 112 relative to the transparent mother sheet 360 as well as by suitably selecting the parameters of the optical assembly 100 (FIG. 3).

Referring still to FIGS. 1A-3 and 8A-8E, the method of processing a transparent mother sheet may further comprise translating the transparent mother sheet 360 relative to the pulsed laser beam 112 (or the pulsed laser beam 112 may be translated relative to the transparent mother sheet 160, for example, in the translation direction 101 depicted in FIGS. 1A and 2) to form the contours 370 (for example, closed contours) in the transparent mother sheet 160 to trace out the desired perimeter 415 of the one or more transparent articles 410 that may be formed in the transparent mother sheet 360 after a subsequent separation step.

Referring now to FIGS. 8C-8E, the method comprises separating a portion of the transparent mother sheet 360 along the contour 370 (FIG. 8C), thereby forming a transparent workpiece assembly 400 (FIGS. 8D and 8E) comprising one or more transparent articles 410 and a frame portion 420 surrounding the one or more transparent articles 410 and frictionally engaged with at least one of the one or more transparent articles 410. In particular, the side surfaces 416 of at least one of the transparent articles 410 are directly frictionally engaged with one or more inner surfaces 426 of the frame portion 420 and a side surface 416 of at least one of the transparent articles 410 is directly frictionally engaged with a side surface 416 of another transparent article 410. In operation, separating the transparent mother sheet 360 comprises applying stress to the one or more contours 370, for example, by applying a mechanical stress to the one or more contours 370, directing an infrared laser beam onto the transparent mother sheet 360 along or near the one or more contours 370, or the like.

Referring now to FIG. 8E, which is a cross-sectional view of the transparent workpiece assembly 400 of FIG. 8D, in some embodiments, the method may next comprise applying one or more layers of material 440 to a surface of at least one of the one or more transparent articles 410. In the embodiment depicted in FIG. 8E, the material 440 is applied to a first major surface 412 of each transparent article 410 and a first major surface 422 of the frame portion 420. In other embodiments, the material 440 may also or alternatively be applied to the second major surface 414 of at least one of the one or more transparent articles 410 and the second major surface 424 of the frame portion 420. Further, in some embodiments, the material 440 may be applied to a surface (e.g., the first major surface 412) of at least one of the one or more transparent articles 410 and not applied to a surface of the frame portion 420. In some embodiments, the layers of material 440 may be applied to the transparent workpiece assembly 400 using any known or yet-to-be developed deposition methods, for example, vapor deposition, (such as chemical vapor deposition, physical vapor deposition, or the like), spin coating, or the like. Further, adding the layers of material 440 to the transparent workpiece assembly 400 may form a composite multi-layered structure. For example, at least one of the layers 440 may comprise an a second transparent mother sheet, as described above, which may be disposed in a stacked arrangement with the transparent articles 410 and the frame portion 420 and in some embodiments, additional layers of material 440.

In other embodiments, the method may further or alternatively comprise modifying a surface of at least of the one or more transparent articles 410, for example, the first major surfaces 412 and/or the second major surfaces 414. For example, modifying the surface of at least one of the one or more transparent articles 410 comprises polishing the surface, cleaning the surface, roughening the surface, etching the surface, patterning the surface (e.g., by forming indents, markings, or other patterns of localized damage in the surface in a or a combination thereof.

Next, after applying the material 440 to a surface of the transparent articles 410 and/or modifying a surface of the transparent articles 410, the method may further comprise releasing at least one of the one or more transparent articles 410 from frictional engagement with the frame portion 420, thereby removing contact between each of the one or more transparent articles 410 and the frame portion 420. In operation, the transparent articles 410 may be released from frictional engagement with the frame portion 420 by breaking the frame portion 420, for example, using a mechanical breaking process, such as a score and break process, a laser separation process, or the like. In embodiments in which at least one layer of material 440 comprises a second transparent mother sheet, the transparent articles of this second transparent mother sheet may be released from frictional engagement with the frame portion of the second transparent workpiece (e.g., by breaking the frame portion of the second transparent workpiece) in the same step that the transparent articles 410 are released from frictional engagement with the frame portion 420 or in an additional step.

In some embodiments, releasing the transparent articles 410 may comprise forming one or more release lines 430 (such as the release perimeter 432 and the release spurs 434) in the frame portion 420. In some embodiments, forming the one or more release lines 430 releases at least one of the one or more transparent articles 410 from frictional engagement with the frame portion 420 and in other embodiments, releasing the one or more transparent articles 410 comprises applying stress to the frame portion 420, for example, to a notch portion 435 extending between at least one of the one or more release lines 430 and the outer surface 428 of the frame portion 420.

In view of the foregoing description, it should be understood that forming and processing transparent articles from a transparent mother sheet may be enhanced by forming and separating a closed contour comprising defects along a closed contour line corresponding with a desired perimeter of each transparent article such that the transparent articles remain frictionally engaged with the remaining portion of the transparent mother sheet. This frictional engagement allows additional processing steps such as the application of layers of material to surfaces of the transparent articles and/or a modification to surfaces of the transparent articles to be performed while the transparent articles remain in-situ with the remaining portion of the transparent mother sheet. After these additional processing steps, the one or more transparent articles may be released. Thus, the embodiments described herein facilitate collective surface processing of transparent articles, which may be faster, cheaper, and more consistent than individually processing the transparent articles due to size constraints, manufacturing constraints, or the like.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent mother sheet, the method comprising:
   forming one or more closed contours in the transparent mother sheet, each closed contour comprising a plurality of defects in the transparent mother sheet such that each closed contour defines a perimeter of a transparent article, wherein forming each of the one or more closed contours comprises:
      directing a pulsed laser beam oriented along a beam pathway and output by a beam source into the transparent mother sheet such that a portion of the pulsed laser beam directed into the transparent mother sheet generates an induced absorption within the transparent mother sheet, the induced absorption producing a defect within the transparent mother sheet; and
      translating the transparent mother sheet and the pulsed laser beam relative to each other along one or more closed contour lines, thereby laser forming defects along the one or more closed contour lines within the transparent mother sheet;
   separating a portion of the transparent mother sheet along the one or more closed contours, thereby forming one or more transparent articles, wherein at least one of the one or more transparent articles is frictionally engaged with a frame portion of the transparent mother sheet;
   applying one or more layers of material to a surface of at least one of the one or more transparent articles after separating the portion of the transparent mother sheet to form the one or more transparent articles; and
   releasing at least one of the one or more transparent articles from frictional engagement with the frame portion of the transparent mother sheet after applying the one or more layers of material to the surface of at least one of the one or more transparent articles.

2. The method of claim 1, wherein separating the portion of the transparent mother sheet along the one or more closed contour lines and thereby forming the one or more transparent articles comprises applying stress to the one or more closed contour lines.

3. The method of claim 1, wherein the one or more layers of material comprise a metallization layer, an anti-reflective coating, a glass, glass-ceramic, a polymer, or a combination thereof.

4. The method of claim 1, wherein:
   the transparent mother sheet comprises a first transparent mother sheet and at least one of the one or more layers of material comprises a second transparent mother sheet;
   the second transparent mother sheet comprises one or more transparent articles and a frame portion that surrounds the one or more transparent articles and is in frictional engagement with the one or more transparent articles; and
   the one or more transparent articles and the frame portion of the second transparent mother sheet are not aligned with the one or more transparent articles and the frame portion of the first transparent mother sheet.

5. The method of claim 1 further comprising forming one or more release lines in the frame portion of the transparent mother sheet.

6. The method of claim 5, wherein forming the one or more release lines releases the at least one of the one or more transparent articles from frictional engagement with the frame portion of the transparent mother sheet.

7. The method of claim 5, wherein releasing each of the one or more transparent articles comprises applying stress to a notch portion extending between at least one of the one or more release lines and an outer surface of the frame portion of the transparent mother sheet.

8. The method of claim 1, wherein:
   the one or more transparent articles comprise a first transparent article and a second transparent article;
   the first transparent article is frictionally engaged with the frame portion of the transparent mother sheet; and
   the second transparent article is frictionally engaged with the first transparent article.

9. The method of claim 1, wherein the portion of the pulsed laser beam directed into the transparent mother sheet comprises:
   a wavelength $\lambda$;
   a spot size $w_o$; and
   a cross section that comprises a Rayleigh range $Z_R$ that is greater than $$F_D \frac{\pi w_0^2}{\lambda},$$

where $F_D$ is a dimensionless divergence factor comprising a value of 10 or greater.

10. A method for processing a transparent mother sheet, the method comprising:
   forming one or more closed contours in the transparent mother sheet, each closed contour comprising a plurality of defects in the transparent mother sheet such that each closed contour defines a transparent article perimeter of a transparent article, wherein forming each of the one or more closed contours comprises:
      directing a pulsed laser beam oriented along a beam pathway and output by a beam source into the transparent mother sheet such that a portion of the pulsed laser beam directed into the transparent mother sheet generates an induced absorption within the transparent mother sheet, the induced absorption producing a defect within the transparent mother sheet; and
      translating the transparent mother sheet and the pulsed laser beam relative to each other along one or more closed contour lines, thereby laser forming defects along the one or more closed contour lines within the transparent mother sheet;
   separating a portion of the transparent mother sheet along the one or more closed contours, thereby forming one or more transparent articles, the one or more transparent articles frictionally engaged with a frame portion of the transparent mother sheet;
   modifying a surface of at least of the one or more transparent articles after separating the portion of the transparent mother sheet to form the one or more transparent articles; and
   releasing at least one of the one or more transparent articles from frictional engagement with the frame portion of the transparent mother sheet after applying one or more layers of material to the surface of at least one of the one or more transparent articles.

11. The method of claim 10, wherein modifying the surface of at least one of the one or more transparent articles comprises polishing, cleaning, and/or roughening the surface of at least one of the one or more transparent articles.

12. The method of claim 10 further comprising forming one or more release lines in the frame portion of the transparent mother sheet.

13. The method of claim 12, wherein forming the one or more release lines releases the at least one of the one or more transparent articles from frictional engagement with the frame portion of the transparent mother sheet.

14. The method of claim 12, wherein releasing each of the one or more transparent articles comprises applying stress to a notch portion extending between at least one of the one or more release lines and an outer surface of the frame portion of the transparent mother sheet.

15. The method of claim 10 wherein:
the one or more transparent articles comprise a first transparent article and a second transparent article;
the first transparent article is frictionally engaged with the frame portion of the transparent mother sheet; and
the second transparent article is frictionally engaged with the first transparent article.

16. The method of claim 10, wherein the portion of the pulsed laser beam directed into the transparent mother sheet comprises:
a wavelength $\lambda$;
a spot size $w_o$; and
a cross section that comprises a Rayleigh range $Z_R$ that is greater than $$F_D \frac{\pi w_0^2}{\lambda},$$

where $F_D$ is a dimensionless divergence factor comprising a value of 10 or greater.

* * * * *